(12) United States Patent
Wakabayashi et al.

(10) Patent No.: US 11,247,694 B2
(45) Date of Patent: Feb. 15, 2022

(54) CONTROL APPARATUS, CONTROL SYSTEM, CONTROL METHOD, AND STORAGE MEDIUM

(71) Applicant: Panasonic Intellectual Property Management Co., Ltd., Osaka (JP)

(72) Inventors: Tohru Wakabayashi, Hyogo (JP); Keiichi Higo, Kyoto (JP); Toshihisa Nakano, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 311 days.

(21) Appl. No.: 16/405,625

(22) Filed: May 7, 2019

(65) Prior Publication Data

US 2019/0263423 A1 Aug. 29, 2019

Related U.S. Application Data

(63) Continuation of application No. PCT/JP2017/036296, filed on Oct. 5, 2017.

(30) Foreign Application Priority Data

Dec. 14, 2016 (JP) .............................. JP2016-242731

(51) Int. Cl.
*B60W 10/18* (2012.01)
*B60W 50/02* (2012.01)
*B60W 30/18* (2012.01)
*B60W 40/105* (2012.01)
*H04L 12/28* (2006.01)
*B60R 16/023* (2006.01)
(Continued)

(52) U.S. Cl.
CPC ....... *B60W 50/0205* (2013.01); *B60R 16/023* (2013.01); *B60T 8/17* (2013.01);
(Continued)

(58) Field of Classification Search
CPC .. B60W 50/0205; B60W 10/18; H04W 12/10; H04W 12/122; B60T 7/12;
(Continued)

(56) References Cited

U.S. PATENT DOCUMENTS 9,575,179 B2 * 2/2017 Fukuman .............. G01S 15/931
9,776,633 B2 * 10/2017 Terashima ........ B60W 30/0956
(Continued)

FOREIGN PATENT DOCUMENTS

JP 2004-017676 1/2004
JP 2008-114806 5/2008
(Continued)

OTHER PUBLICATIONS

International Search Report of PCT application No. PCT/JP2017/036296 dated Dec. 12, 2017.
(Continued)

*Primary Examiner* — McDieunel Marc
(74) *Attorney, Agent, or Firm* — Greenblum & Bernstein, P.L.C.

(57) ABSTRACT

A control apparatus includes a controller, a receiver and a discriminator. The receiver, in operation, receives an instruction for controlling a brake of a movable-body apparatus. The discriminator, in operation, determines, in response to the instruction being received by the receiver, whether or not the instruction is fraudulent based on whether or not a speed of the moving body and a distance between the moving body and an obstacle satisfies a predetermined condition for invalidating the instruction.

22 Claims, 13 Drawing Sheets

(51) Int. Cl.
B60T 8/17 (2006.01)
B60T 8/173 (2006.01)

(52) U.S. Cl.
CPC .............. *B60T 8/173* (2013.01); *B60W 10/18* (2013.01); *B60W 30/18109* (2013.01); *B60W 40/105* (2013.01); *H04L 12/28* (2013.01)

(58) Field of Classification Search
CPC ...... B60T 8/172; B60T 2201/022; B60T 8/17; B60T 8/885; B60T 17/22; B60T 8/171; B60T 2201/083; B60T 8/321
See application file for complete search history.

(56) References Cited

U.S. PATENT DOCUMENTS

| | | | |
|---|---|---|---|
| 2004/0029556 A1 | 2/2004 | Goto et al. | |
| 2010/0256835 A1* | 10/2010 | Mudalige | G06F 19/00 |
| 2014/0309881 A1* | 10/2014 | Fung et al. | B60W 40/09 |
| 2015/0358351 A1 | 12/2015 | Otsuka et al. | |
| 2016/0103980 A1* | 4/2016 | Ricci et al. | G06F 21/12 |

FOREIGN PATENT DOCUMENTS

| | | |
|---|---|---|
| JP | 2014-099098 A | 5/2014 |
| JP | 2014-146868 | 8/2014 |
| JP | 2015-065546 A | 4/2015 |

OTHER PUBLICATIONS

Notice of Reasons for Refusal in Japan dated Dec. 8, 2020 for Japanese Patent Application No. 2019-126502.

* cited by examiner

| Deceleration amount | Value (1 Byte) |
|---|---|
| 0 | 255 |
| 0.5 | 254 |
| 1 | 253 |
| ⋮ | ⋮ |
| 100 (maximum deceleration) | 55 |

CONTROL APPARATUS, CONTROL SYSTEM, CONTROL METHOD, AND STORAGE MEDIUM

CROSS-REFERENCE TO RELATED APPLICATIONS

This application is a continuation of the PCT International Application No. PCT/JP2017/036296 filed on Oct. 5, 2017, which claims the benefit of foreign priority of Japanese patent application No. 2016-242731 filed on Dec. 14, 2016, the contents all of which are incorporated herein by reference.

BACKGROUND

1. Technical Field

The present disclosure relates to a security technology for addressing fraud regarding a brake control instruction message transmitted, for example, in an in-vehicle network via which an electronic control unit mounted on a vehicle performs communication.

2. Description of the Related Art

In recent years, numerous apparatuses called electronic control units (ECUs) are provided in systems installed in automobiles. A network connecting these ECUs is called an in-vehicle network. There are a large number of standards for the in-vehicle network. Among those, one of the most predominant in-vehicle networks is the Controller Area Network (CAN) specified by ISO 11898-1.

In the CAN, the communication path is a bus (CAN bus) including two wires, and the ECU connected to the bus is called a node. Each node connected to the CAN bus transmits and receives frames (messages). A transmission node applies voltages to two buses when transmitting a frame, causes a difference in potential between the buses, and thus transmits value "1" called recessive and value "0" called dominant. When a plurality of transmission nodes transmit recessives and dominants at exactly the same timing, the dominants are preferentially transmitted. If there is a fault in the format of the received frame, a reception node transmits a frame called an error frame. As the error frame, a series of six dominant bits are transmitted, and thus a frame fault is reported to the transmission node and other reception nodes.

In the CAN, there are no identifiers indicating a transmission destination and a transmission source, and the transmission node transmits each frame with an ID called a message ID attached thereto (in other words, sends a signal to the bus), and each reception node receives only the predetermined message ID (in other words, reads a signal from the bus). Furthermore, in the CAN, the carrier sense multiple access/collision avoidance (CSMA/CA) method is used. Upon simultaneous transmission from the plurality of nodes, arbitration is conducted using message IDs, and a frame having a smaller message ID value is preferentially transmitted. In the systems installed in automobiles, the numerous ECUs exchange various frames. For example, the ECUs associate with other ECUs by exchanging frames, and thus a collision avoidance assist function, etc., of an advanced driver assistance system (ADAS) are provided. In the collision avoidance assist function, for example, a brake ECU which controls a brake, a sensor ECU which performs obstacle detection and the like, and an emergency brake ECU which detects a risk of collision with an obstacle and sends a frame of a brake control instruction associate with one another.

Meanwhile, there are threats of unauthorized control of an automobile by an attacker transmitting an attack frame to a CAN bus, for example, by way of connecting an unauthorized node to the CAN bus or attacking an ECU, etc., having the function of communicating with a mobile information terminal, an external communication apparatus, and the like so as to transform the ECU, etc., into an unauthorized node. The attack frame is a frame (fraudulent frame) that is transmitted by an unauthorized attacker to the CAN bus and is not supposed to be transmitted in a normal state of the in-vehicle network. For example, if an attacker transmits, to the CAN bus, a frame of the brake control instruction for causing an abrupt braking action in the state where there is no obstacle ahead of a traveling vehicle, the sudden stop of the vehicle may lead to injury of an occupant, an accident such as collision of a following vehicle, and the like.

A known technique for detecting and defending against such an attack frame is to register, in advance, an expected cycle of a message ID frame which is to be periodically transmitted in an in-vehicle network, and determine, on the basis of the expected cycle, whether or not a frame is fraudulent (refer to Japanese Unexamined Patent Publication No. 2014-146868). However, with the technique disclosed in Japanese Unexamined Patent Publication No. 2014-146868, it is not possible to handle the case where an attacker transmits a frame in accordance with a normal frame transmission cycle of the ECU. For example, when a fraudulent frame is received immediately before a normal frame, the fraudulent frame cannot be detected, and the normal frame subsequent to the fraudulent frame is erroneously detected as fraudulent.

Furthermore, in a conventionally known technique (refer to Japanese Unexamined Patent Publication No. 2008-114806), when numerical information on the wheel speed in the frame received in an in-vehicle network is greater than a predetermined value that is set as a reference, it is determined that there is a fault.

SUMMARY

In the technique disclosed in Japanese Unexamined Patent Publication No. 2008-114806, whether there is a fault in the received frame is determined independently of the cycle of frames, which is not useful for properly handling an attack frame of a fraudulent brake control instruction.

The present disclosure provides a control apparatus which properly handles an attack frame of a fraudulent brake control instruction transmitted by an attacker to a bus in a network (for example, an in-vehicle network) in a movable-body apparatus. Furthermore, the present disclosure provides control system and method for properly handling a fraudulent frame related to a brake control instruction, and a control program used in the control system to properly handle a fraudulent frame related to a brake control instruction.

The control apparatus according to one aspect of the present disclosure includes a controller, a receiver, and a discriminator. The receiver, in operation, receives an instruction for controlling a brake of a movable-body apparatus. The discriminator, in operation, determines, in response to the instruction being received by the receiver, whether or not the instruction is fraudulent based on whether or not a speed of the moving body and a distance between the moving body and an obstacle satisfies a predetermined condition for invalidating the instruction.

Furthermore, a control system according to one aspect of the present disclosure includes: a brake provided to a movable-body apparatus; a detection apparatus which, in operation, detects an obstacle; and a control apparatus. The control apparatus includes: a receiver which, in operation, receives an instruction for controlling the brake; and a discriminator which, in operation, determines, in response to the instruction being received by the receiver, whether or not the instruction is fraudulent based on whether or not a speed of the movable-body apparatus and a distance between the movable-body apparatus and the obstacle satisfies a predetermined condition.

Furthermore, in a control method according to one aspect of the present disclosure, an instruction for controlling a brake of a movable-body apparatus is received. In response to the receiving of the instruction, whether or not the instruction is fraudulent is determined based on whether or not a speed of the movable-body apparatus and a distance between the movable-body apparatus and an obstacle satisfies a predetermined condition for invalidating the instruction.

Furthermore, a control program according to one aspect of the present disclosure is for causing an apparatus including a microprocessor to perform a fraud detection process. In this fraud detection process, an instruction for controlling a brake of a movable-body apparatus is received. In response to the receiving of the instruction, whether or not the instruction is fraudulent is determined based on whether or not a speed of the movable-body apparatus and a distance between the movable-body apparatus and an obstacle satisfies a predetermined condition.

Furthermore, a storage medium according to one aspect of the present disclosure is a non-transitory storage medium storing the aforementioned control program thereon.

According to the present disclosure, a fraudulent frame (attack frame) related to a brake control instruction from an attacker can be invalidated.

DETAILED DESCRIPTION OF PREFERRED EMBODIMENTS

Figure 1:
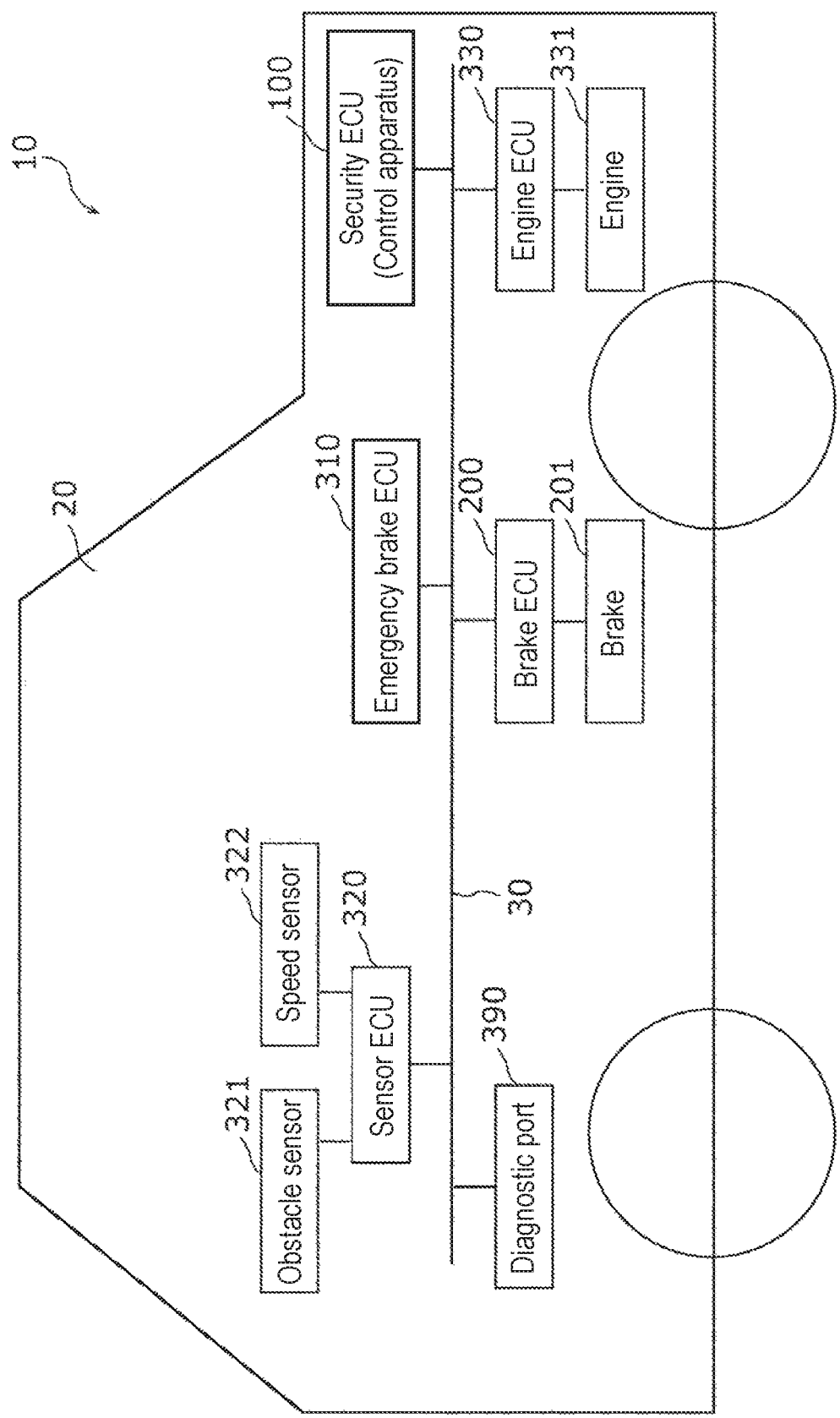
FIG. 1 is a diagram illustrating an overall configuration of a control system according to a first exemplary embodiment.

Prior to describing exemplary embodiments of the present disclosure, underlying knowledge, etc., forming the basis of the present disclosure are described briefly.

The advanced driver assistance system of a vehicle includes an emergency brake ECU for avoiding collision of the vehicle with an obstacle. On the basis of information, etc., obtained from a sensor ECU which performs obstacle detection or the like, the emergency brake ECU transmits a brake control instruction (specifically, a frame of the brake control instruction) to a CAN bus generally immediately before collision. The brake ECU controls a brake in accordance with this brake control instruction, and thus the vehicle stops before collision. Note that examples of the content of the brake control instruction include a designation for inhibiting brake actuation in addition to a designation for actuating the brake.

In a case where an attacker transmits an attack frame of a fraudulent brake control instruction (fraudulent frame) and the content of this fraudulent brake control instruction is different from that of an appropriate brake control instruction which the emergency brake ECU transmits, the vehicle etc. may have an accident. The content of the appropriate brake control instruction is supposed to correspond to the distance between the vehicle and an obstacle located in the direction of travel of the vehicle and the speed of the vehicle. This led to a method for determining whether the brake control instruction transmitted to the CAN bus is an appropriate brake control instruction corresponding to the driving situation of the vehicle or a fraudulent brake control instruction different in content from the appropriate brake control instruction on the basis of the distance between the vehicle and the obstacle located in the direction of travel of the vehicle and the speed of the vehicle (for example, the relative speed or the absolute speeds of the vehicle and the obstacle). Note that a vehicle is one example; this method is applicable to a movable-body apparatus including a vehicle and others. In the control system, etc., according to one aspect of the present disclosure, this method is used to determine whether or not a brake control instruction is fraudulent, and when a brake control instruction is fraudulent, the fraudulent brake control instruction is invalidated to avoid brake control that follows the fraudulent brake control instruction. With this method, it is possible to prevent an accident that occurs due to the attack frame.

The control apparatus according to one aspect of the present disclosure includes a receiver and a controller. The receiver receives an instruction (referred to as a brake control instruction) for controlling a brake of a movable-body apparatus from a bus used for communication among a plurality of electronic control units in the movable-body apparatus. When the distance between the movable-body apparatus and an obstacle and the speed of the movable-body apparatus upon reception of the brake control instruction by the receiver satisfy a predetermined condition (or requirement) for invalidating the brake control instruction, the controller performs control to invalidate or discard the brake control instruction. With this, it is possible to invalidate or discard a fraudulent brake control instruction on the basis of the distance between the movable-body apparatus (for example, a vehicle) and the obstacle (for example, a pedestrian, another vehicle, a building, or the like) and the speed of the movable-body apparatus. The invalidation is, in a broad sense, to inhibit effective action of a brake control instruction. Herein, inhibiting effective action of a brake control instruction on the bus (for example, modification by overwriting with an error frame which will be described later) is referred to as invalidation, and inhibiting effective action of a brake control instruction after an ECU receives the brake control instruction from the bus is referred to as discarding. The discarding includes inhibiting a brake control that follows a brake control instruction.

Furthermore, for example, the aforementioned speed may be a relative speed of the movable-body apparatus with respect to the obstacle. With this, it is possible to properly determine whether or not the brake control instruction is fraudulent (that is, whether or not the brake control instruction is subject to an invalidation control) even when the obstacle is moving.

Furthermore, for example, the controller may determine, by comparing a threshold value and a result of a predetermined calculation based on the aforementioned distance the aforementioned speed, whether or not the aforementioned distance and the aforementioned speed satisfy the predetermined condition. With this, as a result of properly setting the predetermined calculation and the threshold value, it is possible to properly handle a fraudulent brake control instruction.

Furthermore, for example, the brake control instruction may include a designation of an amount of deceleration by the brake, and when the brake control instruction includes a designation of a maximum amount of deceleration, the controller may use a condition where the result of the predetermined calculation is greater than a first threshold value, as the predetermined condition. On the other hand, when the brake control instruction includes a designation of zero deceleration, the controller may use a condition where the result of the predetermined calculation is less than a second threshold value less than or equal to the first threshold value, as the predetermined condition. With this, it is possible to invalidate a fraudulent brake control instruction instructing the brake not to be actuated in a situation in which the brake is to be actuated, or invalidate a fraudulent brake control instruction instructing the brake to be actuated in a situation in which the brake is not to be actuated.

Furthermore, for example, the second threshold value may be less than the first threshold value. With this, it is possible to properly address a situation in which both the brake control instruction instructing the brake to be actuated and the brake control instruction instructing the brake not to be actuated are not necessarily fraudulent (a situation related to the distance between the obstacle and the movable-body apparatus and the speed of the movable-body apparatus).

Furthermore, for example, the plurality of electronic control units may include an emergency brake electronic control unit which transmits the brake control instruction to the bus. In addition, the predetermined calculation may be set to have a result less than or equal to the first threshold value and greater than or equal to the second threshold value when the brake control instruction in a normal state transmitted from the emergency brake electronic control unit to the bus includes a designation of an amount of deceleration greater than zero. With this, it is possible to avoid invalidation of the brake control instruction transmitted in the case where the emergency brake ECU is in a normal state (which is not the case of being under control of an attacker or the case of malfunction).

Furthermore, for example, the predetermine calculation may be subtracting a product of a predetermined coefficient and the aforementioned speed from the aforementioned distance, and the first threshold value may be zero. With this, it is possible to efficiently invalidate a fraudulent brake control instruction using relatively simple calculation.

Furthermore, for example, the predetermined calculation may be subtracting, from the distance, a result obtained by substituting the aforementioned speed for a variable of a polynomial function of a single variable with a predetermined coefficient. With this, as a result of properly setting the coefficient of the polynomial function, it is possible to properly handle a fraudulent brake control instruction.

Furthermore, for example, the controller may modify a detail of the predetermined calculation in accordance with a change in a structural element of the movable-body apparatus that affects a braking distance of the movable-body apparatus by the brake. With this, it is possible to properly invalidate a fraudulent brake control instruction even when a structural element of the movable-body apparatus has changed.

Furthermore, for example, the receiver may receive, from the bus, obstacle information indicating the type of the obstacle detected by the movable-body apparatus, and the controller may modify a detail of the predetermined calculation in accordance with the obstacle information. With this, in a system in which, for example, the timing at which the emergency brake ECU needs to actuate the brake is changed in accordance with the type of the obstacle such as a person and an object, it is possible to properly invalidate a fraudulent brake control instruction.

Furthermore, for example, when the brake control instruction instructs the brake to be actuated, the controller may use a condition where a ratio of the aforementioned distance to the aforementioned speed exceeds a predetermined threshold value, as the predetermined condition. With this, it is possible to properly determine whether or not the brake control instruction instructing the brake to be actuated is fraudulent (that is, whether or not the brake control instruction instructing the brake to be actuated is subject to an invalidation control).

Furthermore, for example, the predetermined condition may be set in accordance with a type of the movable-body apparatus. With this, it is possible to properly determine, in accordance with the brake performance, etc., for each type of vehicle, whether or not the brake control instruction is fraudulent.

Furthermore, for example, the receiver may receive, from the bus, measurement information indicating measurement results of the distance and the speed measured in the movable-body apparatus, and the controller may determine, based on the distance and the speed specified using the measurement information, whether or not the distance and the speed satisfy the predetermined condition. With this, the control apparatus is capable of obtaining the distance and the speed from the bus and thus no longer needs to include a sensor or a communication circuit for communicating with the sensor through a dedicated communication path.

Furthermore, for example, the plurality of electronic control units may perform communication via the bus according to a Controller Area Network (CAN) protocol. In this case, the receiver receives a data frame including the brake control instruction. When the distance and the speed upon reception of the data frame by the receiver satisfy a predetermined condition, the controller may perform control to transmit an error frame for invalidating the data frame. With this, the configuration of the brake ECU does not need to be replaced; for example, as a result of connecting the control apparatus to a bus to which an existing brake ECU is connected, the occurrence of the brake ECU performing an unauthorized control following a fraudulent brake control instruction is reduced.

Furthermore, for example, the control apparatus may be an electronic control unit, among the plurality of electronic control units, which controls the brake of the movable-body apparatus. When the distance and the speed do not satisfy the predetermined condition, the controller may control the brake in accordance with the brake control instruction. On the other hand, when the distance and the speed satisfy the predetermined condition, the controller may perform control to discard the brake control instruction by inhibiting control of the brake that follows the brake control instruction. With this, it is possible to properly handle a fraudulent brake control instruction in the brake ECU.

Furthermore, for example, the plurality of electronic control units may include a brake electronic control unit that includes: a storage medium; and a brake controller which controls the brake in accordance with information stored in the storage medium. The control apparatus may be included in the brake electronic control unit, and when the distance and the speed do not satisfy the predetermined condition, the controller may store, into the storage medium, information indicating the brake control instruction. On the other hand, when the distance and the speed satisfy the predetermined condition, the controller may perform control to discard the brake control instruction by avoiding storing, into the storage medium, the information indicating the brake control instruction. With this, it is possible to properly filter the brake control instruction in the brake ECU.

Furthermore, the control system according to one aspect of the present disclosure includes: a brake provided to a movable-body apparatus; a detection apparatus which detects an obstacle for the movable-body apparatus; and a control apparatus according to one of the above aspects. With this, it is possible to invalidate a fraudulent brake control instruction on the basis of the distance between the movable-body apparatus and the obstacle and the speed of the movable-body apparatus.

Furthermore, in the control method according to one aspect of the present disclosure, a brake control instruction is received from a bus used for communication among a plurality of electronic control units in a movable-body apparatus. When the distance between the movable-body apparatus and an obstacle and the speed of the movable-body apparatus upon reception of the brake control instruction satisfy a predetermined condition, the brake control instruction is invalidated or discarded. With this, it is possible to invalidate a fraudulent brake control instruction on the basis of the distance between the movable-body apparatus and the obstacle and the speed of the movable-body apparatus.

Furthermore, the control program according to one aspect of the present disclosure is for causing an apparatus including a microprocessor to perform a fraud detection process. In this fraud detection process, a brake control instruction is received from a bus used for communication among a plurality of electronic control units in a movable-body apparatus. Whether or not the brake control instruction is fraudulent is detected in accordance with whether or not the distance between the movable-body apparatus and an obstacle and the speed of the movable-body apparatus upon reception of the brake control instruction satisfy a predetermined condition. By installing this control program on an apparatus including a processor (microprocessor), it is possible to properly determine, through execution of the control program by the processor, whether or not the brake control instruction that has appeared on the bus is fraudulent.

Note that these general and specific aspects may be implemented using a system, a method, an integrated circuit, a computer program, or a computer-readable storage medium such as a CD-ROM, or any combination of systems, methods, integrated circuits, computer programs, or storage media. Specifically, the storage medium according to one aspect of the present disclosure is a non-transitory storage medium storing the aforementioned control program thereon.

Hereinafter, control systems, etc., using control methods according to exemplary embodiments will be described with reference to the drawings. Each of the exemplary embodiments described herein shows one specific example of the present disclosure. Therefore, the numerical values, structural elements, the arrangement and connection of the structural elements, as well as procedural steps and the sequence of the steps, etc. shown in the following exemplary embodiments are mere examples, and are not intended to limit the scope of the present disclosure. Among the structural elements in the following exemplary embodiments, structural elements not recited in any one of the independent claims are structural elements that can be arbitrarily added. Furthermore, the respective drawings are schematic diagrams and are not necessarily precise illustrations.

First Exemplary Embodiment

Hereinafter, as one exemplary embodiment of the present disclosure, a control system including a security ECU (control apparatus) which invalidates a frame related to a fraudulent brake control instruction transmitted to a bus (CAN bus) included in an in-vehicle network on a vehicle which is one example of a movable-body apparatus will be described with reference to the drawings.

[1.1 Configuration of Control System 10]

FIG. 1 is a diagram illustrating an overall configuration of control system 10 according to a first exemplary embodiment.

Control system 10 is configured mainly as an in-vehicle network system on vehicle 20 and includes various ECUs installed to vehicle 20 (security ECU 100, brake ECU 200, emergency brake ECU 310, sensor ECU 320, and engine ECU 330) and bus (CAN bus) 30, as exemplified in FIG. 1. Note that although the in-vehicle network system installed to vehicle 20 may include many other ECUs than security ECU 100, brake ECU 200, emergency brake ECU 310, sensor ECU 320, and engine ECU 330, illustrations thereof are omitted and only some ECUs are illustrated in FIG. 1. Furthermore, control system 10 may include an external server apparatus or the like which communicates with any of the ECUs on vehicle 20.

Each of the ECUs is, for example, an apparatus including a communication circuit, an analog circuit, and a digital circuit such as memory and a processor (microprocessor). The memory is a read-only memory (ROM), a random-access memory (RAM), or the like, and a control program (a computer program in the form of software) that is executed by the processor can be stored in the memory. For example, the processor operates in accordance with the control program (computer program), and thus each of the ECUs provides various functions. Note that the computer program is configured of a plurality of instruction codes pieced together. Each of the instruction codes indicates a command to the processor in order to achieve a predetermined function. The ECUs are capable of exchanging frames with one another via bus 30 in the vehicle according to the CAN protocol.

Some of the ECUs are connected to various devices such as a sensor, an actuator, a user interface device, and the like via communication paths other than bus 30. For example, brake ECU 200 is connected to brake 201 and controls brake 201. Engine ECU 330 is connected to engine 331 and controls engine 331. Sensor ECU 320 is connected to obstacle sensor 321 and speed sensor 322 and periodically transmits, to bus 30, frames (data frames) each indicating measurement information obtained by each sensor. In the in-vehicle network system, there may be sensor ECUs 320 in one-to-one correspondence with each sensor; however, for illustrative purposes, description will be carried out here under the assumption that there is single sensor ECU 320 capable of transmitting frames indicating measurement information obtained by each of the plurality of sensors. Obstacle sensor (detection apparatus) 321 detects an obstacle located in a traveling direction of vehicle 20 and measures, for example, the distance between vehicle 20 and the obstacle. Speed sensor 322 detects the speed of vehicle 20 and is capable of detecting, for example, the absolute speed of vehicle 20, but description will be carried out here under the assumption that speed sensor 322 detects the relative speed of vehicle 20 with respect to the obstacle detected by obstacle sensor 321. Note that when the obstacle is not moving, the absolute speed of vehicle 20 is equal to the relative speed of the vehicle with respect to the obstacle.

Emergency brake ECU 310 provides a collision avoidance assist function, etc., as an advanced driver assistance system. Emergency brake ECU 310 periodically transmits frames of brake control instructions to bus 30 on the basis of the measurement information or the like obtained from sensor ECU 320 in order to request a brake control of brake ECU 200. Note that emergency brake ECU 310 may be, for example, integrated with sensor ECU 320 to directly obtain the measurement information or the like from each sensor not via bus 30. Emergency brake ECU 310 transmits, to bus 30, a frame of a brake control instruction including a designation for requesting actuation of the brake generally immediately before collision, for example.

Diagnostic port 390 is a terminal connected to bus 30 such as an on-board diagnostics 2 (OBD2), and a device such as a diagnostic tool (failure diagnostic tool) can access bus 30 through diagnostic port 390. There is a possibility that an attacker may inject (transmit) a frame (data frame) of a fraudulent brake control instruction to bus 30, for example, via diagnostic port 390 or the like.

Security ECU 100 provides a function for ensuring the security of the in-vehicle network system. Security ECU 100 functions as a control apparatus which monitors frames flowing in bus 30 and invalidates, by transmitting an error frame, a data frame related to a fraudulent brake control instruction that has appeared on bus 30, thus properly handling an attack frame of a fraudulent brake control instruction. Note that security ECU 100 may include the function of invalidating not only a fraudulent brake control instruction, but also other fraudulent data frames under a predetermined condition.

[1.2 Data Frame Format]

Hereinafter, a data frame (message) which is one of the frames used in a network that follows the CAN protocol will be described.

Figure 2:
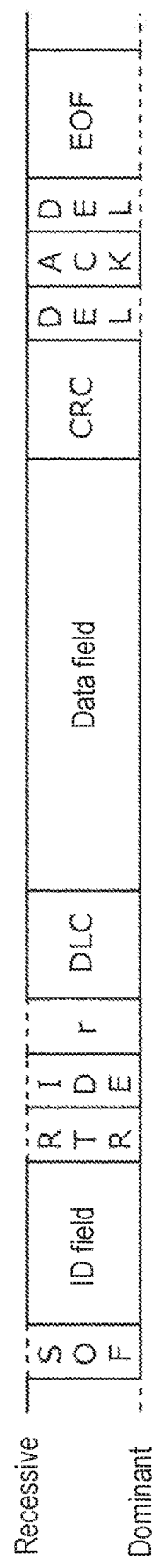
FIG. 2 is a diagram illustrating the format of a data frame specified in the CAN protocol.

FIG. 2 is a diagram illustrating the format of a data frame specified in the CAN protocol. FIG. 2 illustrates a data frame in a standard ID format specified in the CAN protocol. The data frame includes: a start of frame (SOF); an ID field; a remote transmission request (RTR); an identifier extension (IDE); a reservation bit "r"; a data length code (DLC); a data field; a cyclic redundancy check (CRC) sequence; a CRC delimiter "DEL"; an acknowledgement (ACK) slot; an ACK delimiter "DEL"; and an end of frame (EOF) field.

The SOF is made up of 1 dominant bit. The SOF is recessive while the bus is in an idle state, and upon a change of the SOF to be dominant, the start of transmission of a frame is reported.

The ID field is an 11-bit field which stores an ID (message ID) being a value indicating the type of data. In the case where a plurality of nodes start transmission at the same time, communication arbitration is conducted in this ID field; therefore, the ID field is designed so that a frame having a less ID value is given a higher level of priority.

The RTR is a value used to identify the data frame and a remote frame; in the data frame, the RTR is made up of 1 dominant bit.

Each of the IDE and "r" is made up of 1 dominant bit.

The DLC is a value made up of 4 bits and indicating the length of the data field. Note that the IDE, the "r", and the DLC are collectively referred to as a control field.

The data field is a value made up of a maximum of 64 bits and indicating the content of data to be transmitted. The length of the data field can be adjusted in increments of 8 bits. The specification of data to be transmitted is not specified in the CAN protocol and is determined in the in-vehicle network system. Therefore, the specification depends on the type of the vehicle, a manufacturer (manufacturing company), and the like.

The CRC sequence is made up of 15 bits. The CRC sequence is calculated from transmission values of the SOF, the ID field, the control field, and the data field.

The CRC delimiter is a boundary symbol made up of 1 recessive bit and representing the end of the CRC sequence. Note that the CRC sequence and the CRC delimiter are collectively referred to as a CRC field.

The ACK slot is made up of 1 bit. A transmission node sets the ACK slot to be recessive and performs transmission. When a reception node successfully receives a frame up to the CRC sequence in a normal way, the reception node sets the ACK slot to be dominant and transmits it. Since the dominant bit has priority over the recessive bit, if the ACK slot is dominant after transmission, the transmission node can confirm that one of the reception nodes has successfully received it.

The ACK delimiter is a boundary symbol made up of 1 recessive bit and representing the end of the ACK.

The EOF is made up of 7 recessive bits and indicates the end of the data frame.

[1.3 Error Frame Format]

Figure 3:
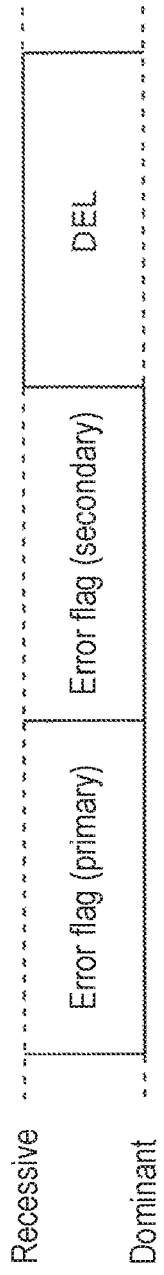
FIG. 3 is a diagram illustrating the format of an error frame specified in the CAN protocol.

FIG. 3 is a diagram illustrating the format of an error frame specified in the CAN protocol. The error frame includes an error flag (primary), an error flag (secondary), and an error delimiter.

The error flag (primary) is used to notify other nodes of the occurrence of an error. A node that has detected an error transmits 6 consecutive dominant bits in order to notify other nodes of the occurrence of the error. This transmission is in violation of the rule of bit stuffing (prohibiting transmission of 6 or more consecutive bits having the same value) in the CAN protocol, and induces transmission of an error frame (secondary) from other nodes.

The error flag (secondary) is made up of 6 consecutive dominant bits that are used to notify other nodes of the occurrence of an error. All nodes that have received the error flag (primary) and detected the violation of the rule of bit stuffing transmit the error flag (secondary).

The error delimiter "DEL" is made up of 8 consecutive recessive bits and indicates the end of the error frame.

[1.4 Configuration of Brake ECU 200]

Figures 4, 5:
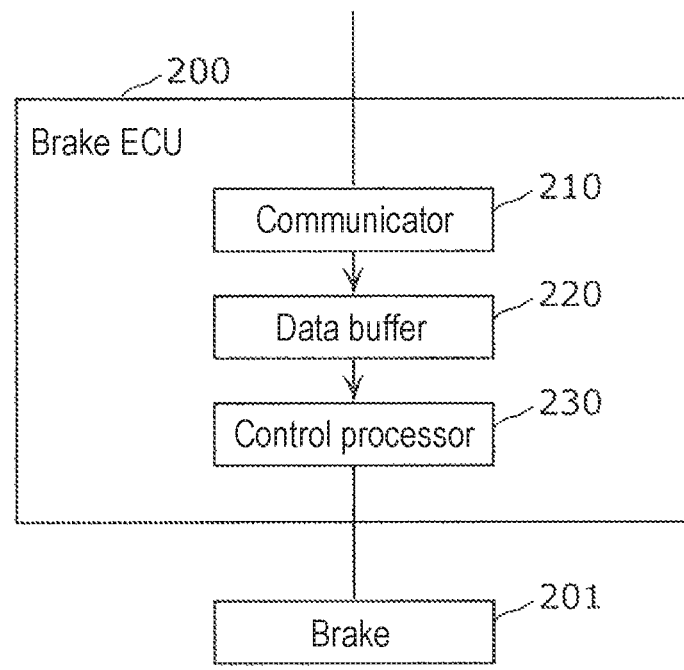
FIG. 4 is a configuration diagram of a brake ECU according to the first exemplary embodiment.
FIG. 5 is a diagram illustrating one example of a data field of a frame related to a brake control instruction transmitted by an emergency brake ECU according to the first exemplary embodiment.

FIG. 4 is a configuration diagram of brake ECU 200. Brake ECU 200 for controlling brake 201 includes communicator 210, data buffer 220, and control processor (brake controller) 230.

Communicator 210 is an integrated circuit (for example, a communication circuit, a memory, and a processor) which controls communication on bus 30. Communicator 210 includes, for example, a frame transmission/reception function unit, a received frame interpreting function unit, and the like as functional structural elements. The frame transmission/reception function unit exchanges (receives/transmits) frames (sequentially exchanges frames on 1-bit basis) with bus 30 according to the CAN protocol, for example. The received frame interpreting function unit interprets the values in the frame received by the frame transmission/reception function unit, so as to map (assign or allocate) the values in the fields in the frame format specified in the CAN protocol. The received frame interpreting function unit determines whether or not the value determined as the ID field is the ID (message ID) to be received by brake ECU 200, and if the value is not the ID to be received, interpretation of the frame is stopped. When determining the frame as not complying with the CAN protocol, for example, in the case where the value of the CRC is not correct or in the case where an item supposed to be fixedly dominant is recessive, the received frame interpreting function unit performs control to transmit an error frame. Furthermore, when receiving the error frame, specifically, when interpreting the received frame as an error frame from values therein, the received frame interpreting function unit discards the subsequent portion of the frame or in other words stops interpreting the subsequent portion of the frame. The received frame interpreting function unit stores, into data buffer 220, the content (ID, data in the data field, etc.) of the frame having an ID determined as the ID to be received. The ID of a data frame indicating a brake control instruction, predetermined in the in-vehicle network system in control system 10, is determined by the received frame interpreting function unit of communicator 210 as the ID to be received.

Data buffer 220 is one storage region of a storage medium such as memory, a register, and the like. In data buffer 220, information indicating the ID, the data in the data field, etc., as the content of the frame having an ID to be received (for example, information indicating a brake control instruction), received by communicator 210, is stored. Upon simultaneous transmission of data frames from the plurality of nodes to bus 30, arbitration is conducted using the IDs. Therefore, the timing at which brake ECU 200 receives, from bus 30, a data frame related to a brake control instruction transmitted by emergency brake ECU 310 does not necessarily exactly match a constant cycle (for example, 50 ms) and may have some deviation from the constant cycle. In brake ECU 200, data buffer 220 is used to efficiently process the received data frame in accordance with a variation in the reception timing that occurs during such communication arbitration.

Control processor 230 obtains the content (information indicating a brake control instruction or the like) of the frame stored in data buffer 220, periodically or, for example, when a predetermined condition (such as a condition related to storing of a frame into data buffer 220) is met, and controls brake 201 by transmitting a control signal to brake 201 in accordance with the brake control instruction indicated in the obtained information.

Note that aside from brake ECU 200, an ECU (for example, engine ECU 330) capable of controlling the actuator also includes a control processor for controlling the communicator, the data buffer, and the actuator, as same as brake ECU 200. Sensor ECU 320 connected to the sensor(s) includes, for example, a processor, a communicator, and the like. The processor obtains a measurement result of the sensor and generates a data frame including, in a data field, measurement information indicating the measurement result with a predetermined message ID attached thereto. The communicator transmits the data frame to bus 30 according to the CAN protocol. This measurement information indicates the measurement result of the distance between vehicle 20 and an obstacle and the relative speed of vehicle 20 with respect to the obstacle.

[1.5 Brake Control Instruction]

FIG. 5 is a diagram illustrating one example of a data field of a frame related to a brake control instruction transmitted by emergency brake ECU 310. The data field in the frame of the brake control instruction includes an amount of deceleration by brake 201 (a requested level of deceleration that is effected by brake 201); an example of the content of this deceleration amount is illustrated in FIG. 5. Note that the data field in the frame of the brake control instruction may additionally include information other than the deceleration amount (for example, a flag or the like indicating whether the brake control instruction is valid or invalid); however, for illustrative purposes, description will be carried out here under the assumption that the data field includes the deceleration amount only. The deceleration amount itself does not necessarily need to match the value (data value) in the data field. The deceleration amount is represented, for example, by 1 byte; value 255 represents zero (0) deceleration, and value 55 represents the maximum amount (for example, 100) of deceleration.

When a brake control instruction including a designation of an amount of deceleration greater than zero (0) is transmitted from emergency brake ECU 310, brake ECU 200 actuates brake 201 in accordance with the deceleration amount of the brake control instruction. This means that brake ECU 200 actuates brake 201 in such a manner that a higher braking effect (greater brake force) is obtained as the deceleration amount of the brake control instruction is greater. Specifically, when the deceleration amount of the brake control instruction is maximum (for example, 100), control processor 230 of brake ECU 200 controls brake 201 so that brake 201 is actuated to apply the maximum brake force corresponding to what is called full braking. When a brake control instruction including a designation of zero deceleration from emergency brake ECU 310, control processor 230 of brake ECU 200 inhibits actuation of brake 201 that follows the brake control instruction. Note that in the case where brake ECU 200 performs control of brake 201 in accordance with a brake pedal operation conducted by a driver of vehicle 20, for example, the control in accordance with the operation by the driver may be given priority over the control of inhibiting the actuation of brake 201.

[1.6 Configuration of Security ECU 100]

Figure 6:
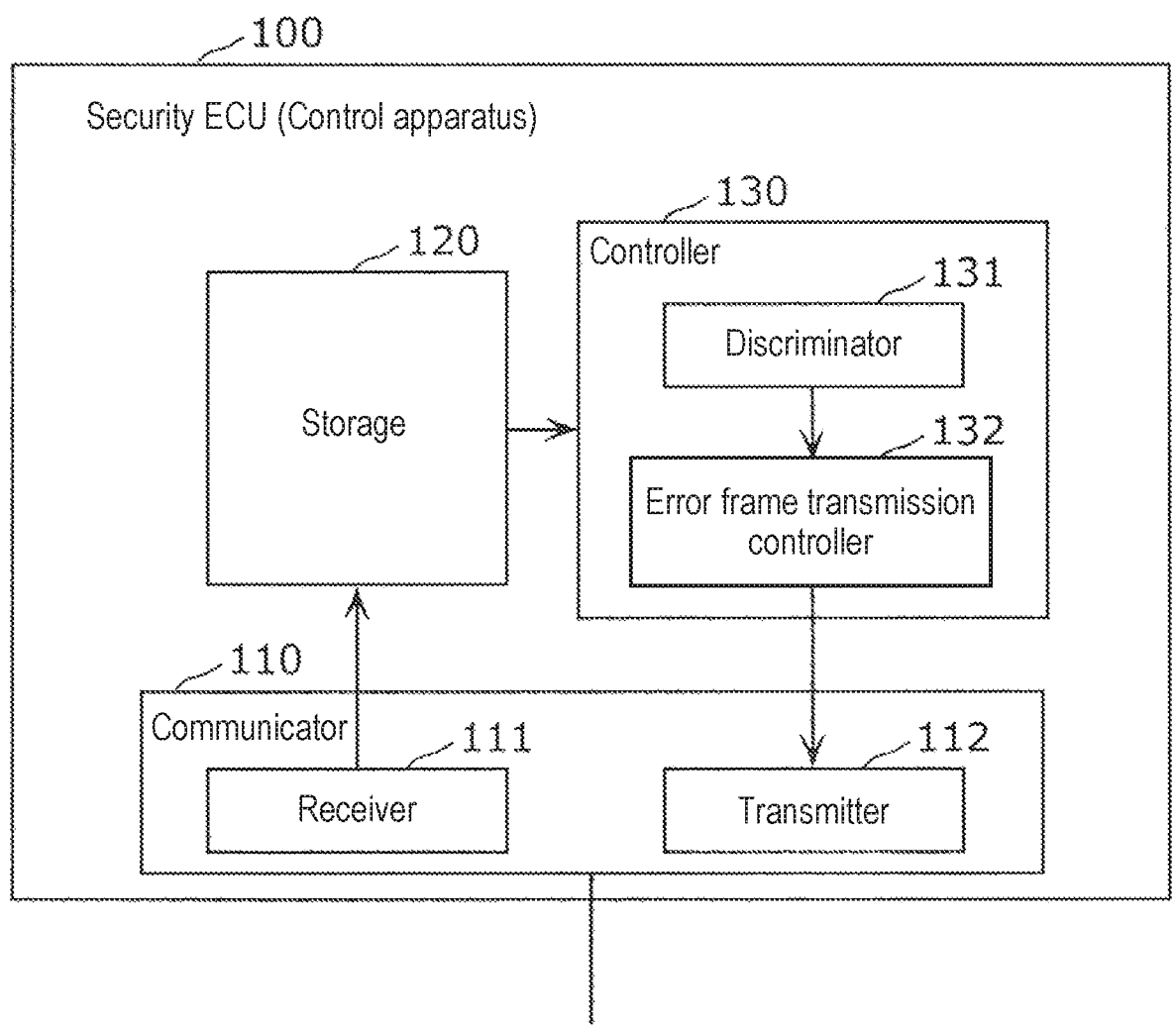
FIG. 6 is a configuration diagram of a security ECU (control apparatus) according to the first exemplary embodiment.

FIG. 6 is a configuration diagram of security ECU 100. Security ECU 100 has a function as a control apparatus which monitors frames flowing in bus 30 and invalidates, by transmitting an error frame, a data frame related to a fraudulent brake control instruction that has appeared on bus 30. In order to provide this function, security ECU 100 includes communicator 110, storage 120, and controller 130. The functions of these structural elements are provided by, for example, a communication circuit, a storage medium such as memory, and a processor, a digital circuit, or the like which executes a control program stored in the memory, in security ECU 100.

Communicator 110 is provided with, for example, a communication circuit and a processor which executes a control program. Communicator 110 includes receiver 111 and transmitter 112 for exchanging frames (sequentially exchanging frames on 1-bit basis) with bus 30 according to the CAN protocol. Receiver 111 receives a frame (for example, a data frame related to a brake control instruction and/or a data frame including measurement information) from bus 30. When receiver 111 receives the frame from bus 30, communicator 110 interprets the frame so as to map the data of the frame to the fields in the frame format specified in the CAN protocol, and thus discerns and extracts respective data of the ID (message ID), the DLC, and the data field. Communicator 110 determines whether or not the extracted ID is one of the ID to be received such as the ID of a data frame indicating the brake control instruction, predetermined in the in-vehicle network system in control system 10, and the ID of a data frame indicating the measurement information transmitted from sensor ECU 320. If the extracted ID is not the ID to be received, communicator 110 stops interpreting the frame. Communicator 110 stores, into storage 120, the content (such as ID and data) of the frame which is received by receiver 111 and has the ID to be received. Furthermore, communicator 110 transmits the error frame from transmitter 112 to bus 30 upon receiving an instruction for transmitting an error frame from controller 130.

Storage 120 is one storage region of a storage medium such as a memory for storing the content of a frame received by receiver 111. For example, the measurement information sequentially transmitted from sensor ECU 320 is stored in storage 120. The measurement information indicates the distance between vehicle 20 and an obstacle and the relative speed of vehicle 20 with respect to the obstacle as the measurement result obtained by a sensor on vehicle 20.

Controller 130 is provided with, for example, a processor which executes a control program and has a function of performing an invalidation control of invalidating a data frame of a brake control instruction under a predetermined condition. Controller 130 includes discriminator 131 and error frame transmission controller 132.

Discriminator 131 determines whether or not a brake control instruction is fraudulent (that is, whether or not the data frame of the brake control instruction needs to be invalidated) in accordance with whether or not the predetermined condition involving the distance between vehicle 20 and the obstacle and the speed of vehicle 20 upon reception of the data frame of the brake control instruction by receiver 111 is satisfied. Discriminator 131 specifies the distance between vehicle 20 and the obstacle and the speed of vehicle 20 on the basis of the measurement information received by receiver 111, and determines, on the basis of the specified speed and distance, whether or not the predetermined condition is satisfied. This determining process is performed by receiver 111 receives the entire data frame of the brake control instruction from bus 30 (in other words, before the end of the data frame; for example, immediately after reception of the data field or immediately after reception of the CRC sequence). When determining the brake control instruction as being fraudulent, discriminator 131 reports such fact to error frame transmission controller 132. Discriminator 131 uses the distance between vehicle 20 and the obstacle and the speed of vehicle 20 (the speed relative to an obstacle) indicated in the latest measurement information upon reception of the data frame of the brake control instruction among the pieces of measurement information which have been sequentially stored in storage 120, as the distance between vehicle 20 and the obstacle and the speed of vehicle 20 upon reception of the data frame of the brake control instruction by receiver 111.

When discriminator 131 determines the brake control instruction as being fraudulent, error frame transmission controller 132 performs the invalidation control by causing transmitter 112 to transmit an error frame to bus 30, in order to invalidate the data frame of the brake control instruction that has appeared on bus 30. The invalidation control by error frame transmission controller 132 is performed by transmitting the error frame to bus 30 before the end of the data frame of the brake control instruction (EOF) is completely received. When the invalidation control is performed, the data frame of the brake control instruction is overwritten on bus 30 as a result of transmission of the error frame before the end of the data frame of the brake control instruction, and thus in brake ECU 200, the data frame of the brake control instruction is discarded, meaning that the brake control that follows the brake control instruction is not performed.

[1.7 Determining Whether or Not Brake Control Instruction is Fraudulent]

The following describes a method in which discriminator 131 of controller 130 in security ECU 100 (control apparatus) described above determines whether or not the brake control instruction is fraudulent.

For example, when predetermined condition C involving distance L (m) between an obstacle and the vehicle and relative speed V (km/h) of the vehicle with respect to the obstacle upon reception of the brake control instruction is satisfied, discriminator 131 determines the brake control instruction as being fraudulent. As a specific example, discriminator 131 compares a threshold value and the result of predetermined calculation F(V, L) based on distance L and relative speed V, and determines whether or not the predetermined condition C is satisfied.

As a more detailed example, when the brake control instruction received by receiver 111 (that is, the brake control instruction related to the received data frame) includes a designation of the maximum amount of deceleration, for example, discriminator 131 uses a condition where the result of predetermined calculation F(V, L) is greater than first threshold value a, as predetermined condition C. When the brake control instruction received by receiver 111 includes a designation of zero deceleration, discriminator 131 uses a condition where the result of predetermined calculation F(V, L) is less than second threshold value b which is less than or equal to first threshold value a, as predetermined condition C. This indicates that, for example, in a situation in which a brake control instruction for actuating the brake in such a manner as to maximize the deceleration amount is fraudulent, the brake control instruction for inhibiting brake actuation (setting the deceleration to zero) is not fraudulent, and in a situation in which a brake control instruction for inhibiting brake actuation is fraudulent, a brake control instruction for actuating the brake in such a manner as to maximize the deceleration amount is not fraudulent. Note that for example, second threshold value b may be less than first threshold value a.

Furthermore, the predetermined calculation may be represented as F(V, L)=L−G(V), for example. Here, G is a polynomial function of a single variable with a predetermined coefficient. The polynomial function may be a linear function or may be an n-dimensional function where n is at least 2. In this case, predetermined calculation F(V, L) results in a value obtained by subtracting, from distance L, G (V) in which the speed (relative speed V) is substituted for the variable of G.

Furthermore, as one simplified example, the predetermined calculation may be F(V, L)=L−kV. Here, k is a predetermined coefficient.

Figure 7:
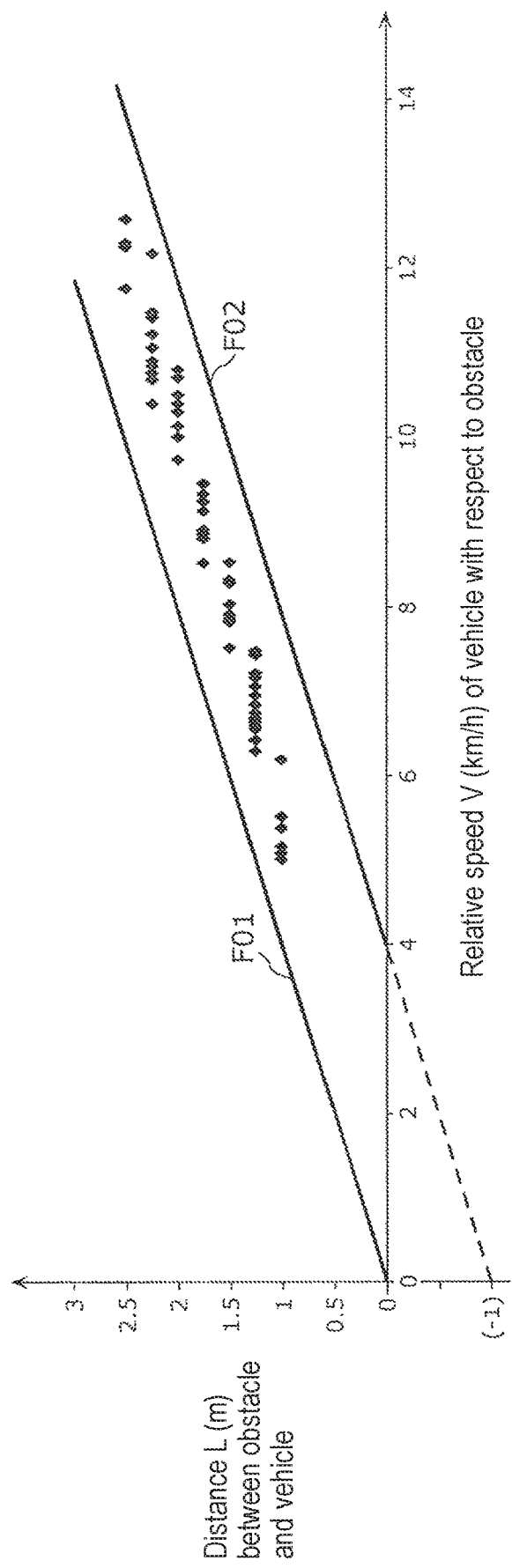
FIG. 7 is a diagram for explaining a condition for determining fraud in the brake control instruction according to the first exemplary embodiment.

FIG. 7 is a diagram for explaining a condition for determining fraud in a brake control instruction. FIG. 7 plots, as dots (black rhomboids) on a graph, the distribution of experimental results each obtained by measuring distance L (m) between vehicle 20 and an obstacle and relative speed V (km/h) of vehicle 20 with respect to the obstacle when emergency brake ECU 310 in a normal state transmits, to bus 30, a data frame of a brake control instruction including a designation of an amount of deceleration greater than zero. Predetermination calculation F(V, L) mentioned above is set so that the result of predetermined calculation F(V, L) is in a range between first threshold value a and second threshold value b, inclusive, in the case where such a brake control instruction transmitted from emergency brake ECU 310 in a normal state and received by receiver 111 includes a designation of an amount of deceleration greater than zero. Thus, the brake control instruction transmitted by emergency brake ECU 310 in a normal state does not satisfy predetermined condition C.

In addition, FIG. 7 indicates straight line F01 and straight line F02. Straight line F01 indicates relational expression L−kV=0, and straight line F02 indicates relational expression L−kV=−1. Here, coefficient k is 0.25.

As one example, in a situation in which the relationship between distance L and relative speed V is above straight line F01 in FIG. 7, when a brake control instruction (instruction for actuating the brake) designating the maximum deceleration amount is transmitted to bus 30, the brake control instruction may be determined as being fraudulent. Similarly, in a situation in which the relationship between distance L and relative speed V is below straight line F02 in FIG. 7, when a brake control instruction (instruction for inhibiting brake actuation) designating the zero deceleration is transmitted to bus 30, the brake control instruction may be determined as being fraudulent. In this example, assuming that predetermined calculation F(V, L) is defined by F(V, L)=L−kV, first threshold value a is defined by a=0, second threshold value b is defined by b=−1, discriminator 131 uses, for a brake control instruction including a designation of maximum deceleration amount, a condition where the result of predetermined calculation F(V, L) is greater than first threshold value a, as predetermined condition C. Furthermore, discriminator 131 uses, for a brake control instruction including a designation of zero deceleration, a condition where the result of predetermined calculation F(V, L) is less than second threshold value b which is less than or equal to first threshold value a, as predetermined condition C. These correspond to determining a brake control instruction as being fraudulent when predetermined condition C is satisfied. This is merely one example, predetermined condition C for determining whether or not a brake control instruction is fraudulent can be set on the basis of experimental results as described above, for example.

Note that in consideration of the relationship between straight line F01 and the experimental results in FIG. 7, when the brake control instruction received by receiver 111 instructs the brake to be actuated (for example, a brake control instruction designating a deceleration amount other than zero), discriminator 131 may use a condition where the ratio of distance L to relative speed V exceeds a predetermined threshold value, as predetermined condition C. The predetermined condition for determining a brake control instruction as being fraudulent may be, for example, one that is satisfied when relative speed V belongs to one or more specific sections (for example, 8 km/h to 10 km/h) among a plurality of range sections and distance L belongs to one or more specific sections (for example, 3 m to 4 m) among a plurality of range sections.

[1.8 Control Process in Security ECU 100]

Figure 8:
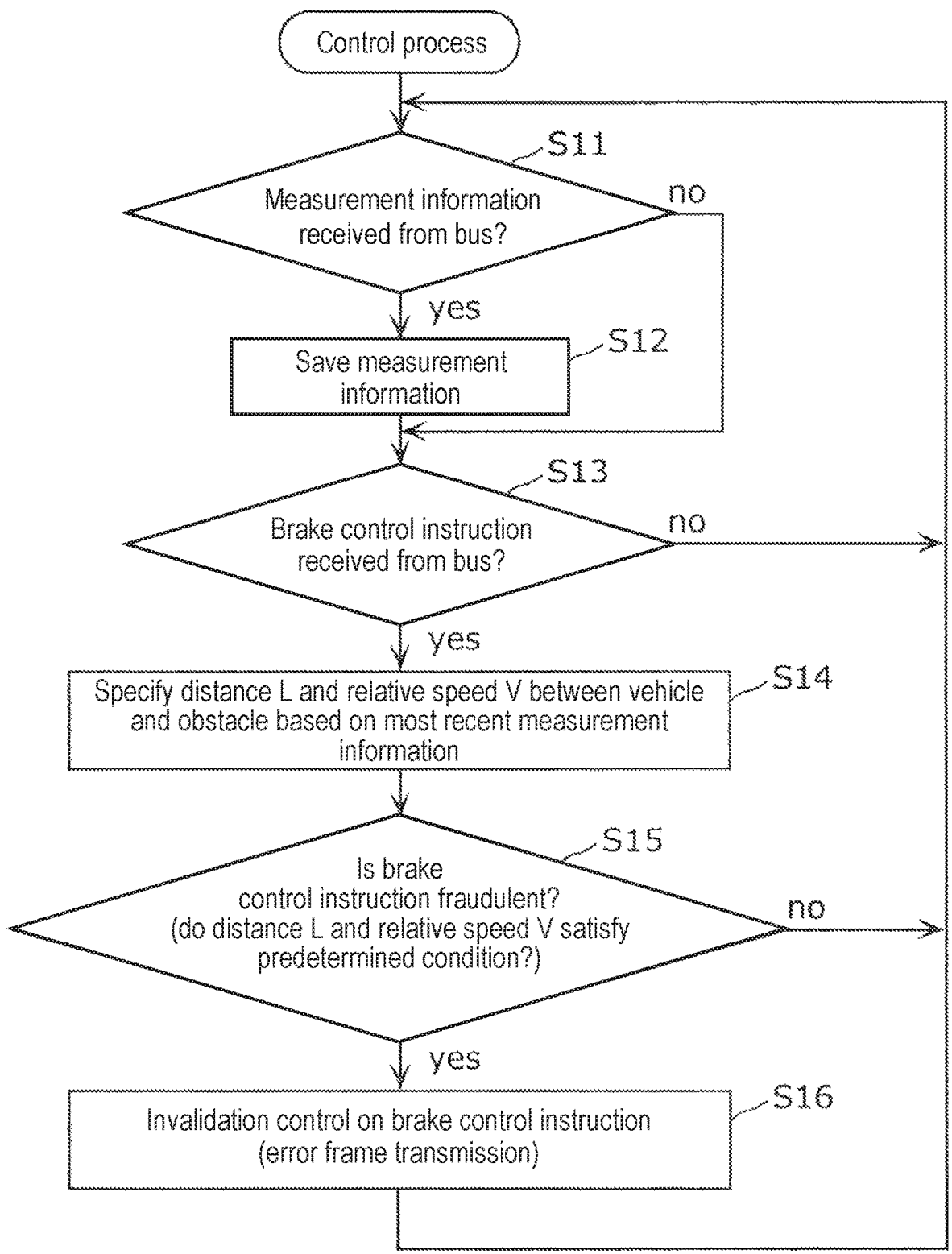
FIG. 8 is a flowchart illustrating a control process in the security ECU illustrated in FIG. 6.

FIG. 8 illustrates one example of a control process in security ECU 100. With reference to FIG. 8, the following describes a control process which is performed to properly handle an attack frame of a fraudulent brake control instruction in security ECU 100.

When receiver 111 receives, from bus 30, a data frame including measurement information transmitted by sensor ECU 320 (YES in Step S11), security ECU 100 saves, in other words, stores, the measurement information in storage 120 (Step S12). Thus, the measurement information indicating distance L (m) between an obstacle and the vehicle and relative speed V (km/h) of the vehicle with respect to the obstacle is saved in storage 120. Sensor ECU 320 periodically transmits data frames each including measurement information indicating a measurement result obtained by a sensor, and thus saving measurement information in Step S12 is repeatedly performed.

When receiver 111 receives the data frame of the brake control instruction from bus 30 (YES in Step S13), security ECU 100 specifies distance L and relative speed V between the vehicle and the obstacle using discriminator 131 on the basis of the latest measurement information saved most recently in storage 120 (Step S14). Subsequently, by determining whether or not predetermined condition C involving distance L and relative speed V that have been specified is satisfied, discriminator 131 determines whether or not the brake control instruction related to the data frame received in Step S13 is fraudulent (Step S15). Note that when receiver 111 completes reception of the data frame of the brake control instruction up to the data field thereof, the content of a designation of an amount of deceleration in the brake control instruction can be obtained, and thus discriminator 131 can specify, for example, whether the designated deceleration amount is maximum, zero, or any other values. For example, discriminator 131 uses, for a brake control instruction including a designation of a maximum deceleration amount, a condition where the result of predetermined calculation F(V, L) is greater than first threshold value a, as predetermined condition C, and uses, for a brake control instruction including a designation of zero deceleration, a condition where the result of predetermined calculation F(V, L) is less than second threshold value b which is less than or equal to first threshold value a, as predetermined condition C. Furthermore, discriminator 131 may use, for example, for a brake control instruction including a designation of a deceleration amount between zero and the maximum, a condition where the result of predetermined calculation F(V, L) is greater than first threshold value a or a condition where the result of predetermined calculation F(V, L) is greater or less than any other predetermined threshold value, as predetermined condition C.

When discriminator 131 determines in Step S15 that predetermined condition C is satisfied (YES in Step S15), this means that the brake control instruction is determined as being fraudulent. In this case, by causing transmitter 112 to transmit an error frame, error frame transmission controller 132 performs the invalidation control of invalidating the data frame of the brake control instruction (Step S16).

[1.9 Process Sequence Related to Brake Control in Control System 10]

Figure 9:
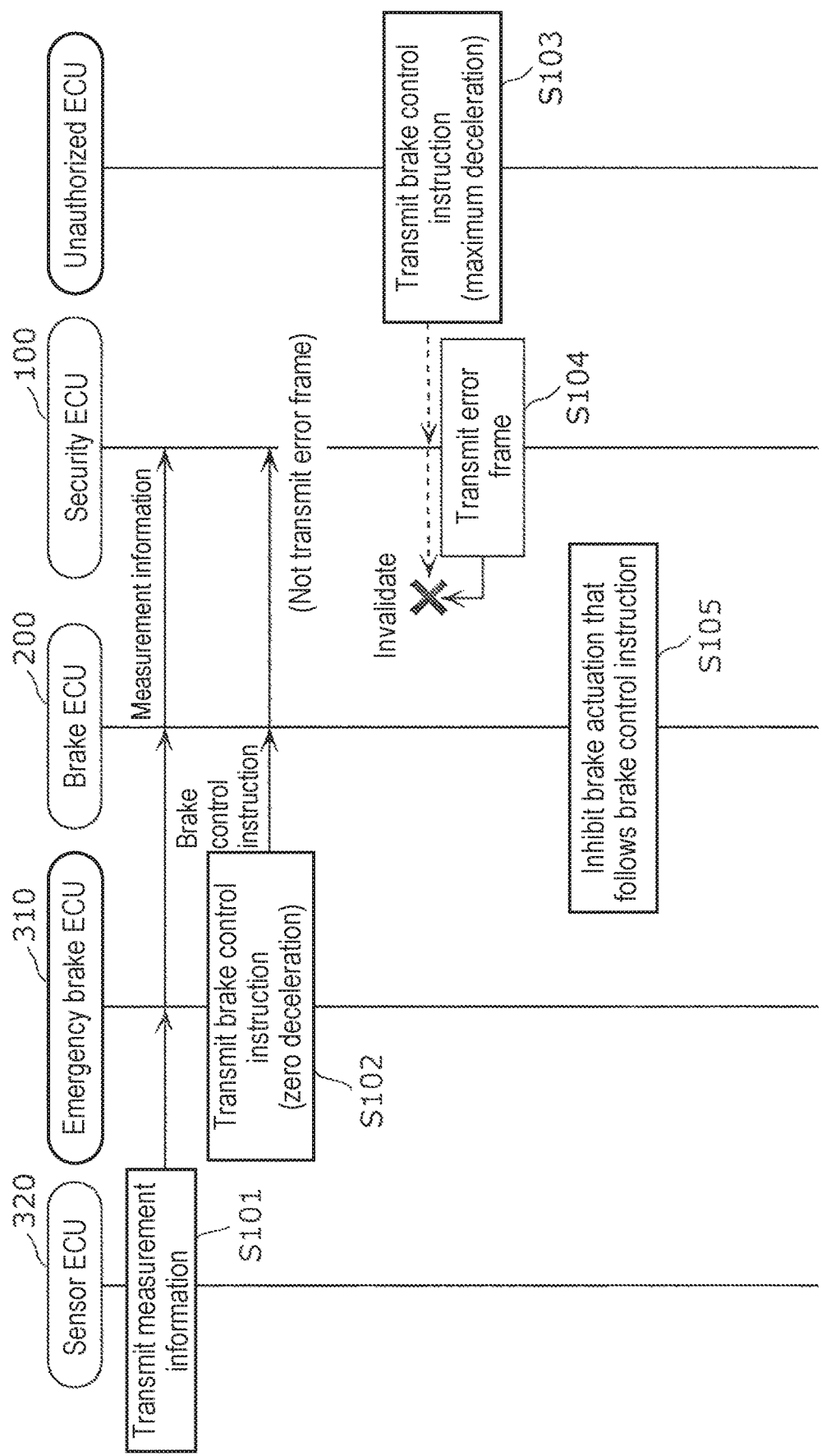
FIG. 9 is a diagram illustrating one example of a process sequence related to a brake control according to the first exemplary embodiment.
Figure 10:
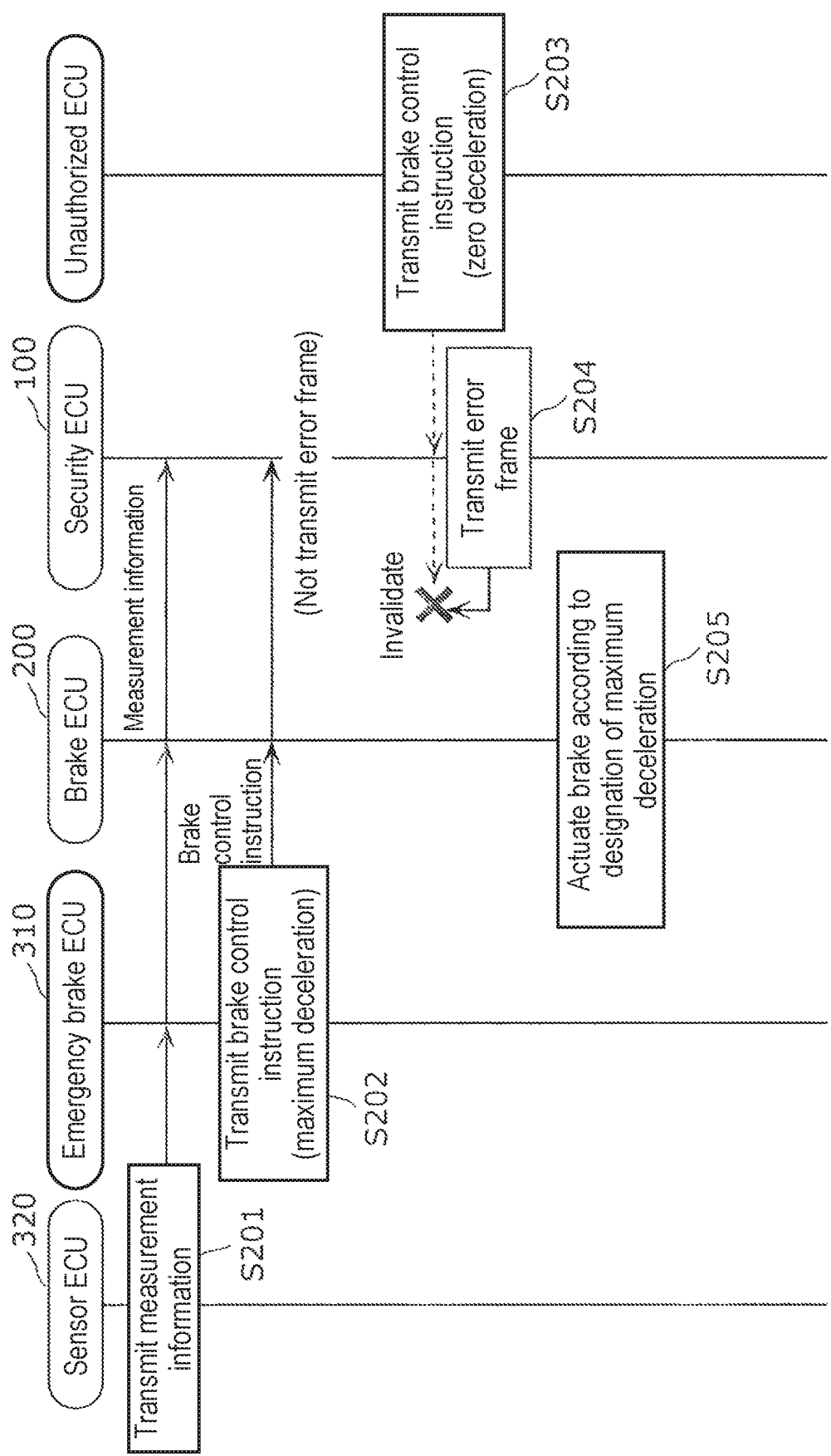
FIG. 10 is a diagram illustrating one example of a process sequence related to the brake control according to the first exemplary embodiment.

FIG. 9 and FIG. 10 illustrate one example of a process sequence related to a brake control in control system 10.

FIG. 9 illustrates an example where, in a situation in which there is no risk that vehicle 20 will collide with an obstacle, an apparatus (referred to as an unauthorized ECU) connected to diagnostic port 390 transmits a data frame of a fraudulent brake control instruction (instruction for causing an abrupt braking action) to bus 30. With reference to FIG. 9, operations of ECUs in control system 10 will be described below. Note that the example where the unauthorized ECU is an apparatus connected to diagnostic port 390 is described here, but this is merely one example of an unauthorized apparatus that can access bus 30. For example, in the case where any of the ECUs connected to bus 30 is attacked and controlled by an attacker (for example, the case where the firmware or the like of one of the ECUs is improperly rewritten), this ECU may save as the unauthorized ECU.

Sensor ECU 320 transmits, to bus 30, a data frame including measurement information indicating measurement results obtained by obstacle sensor 321 and speed sensor 322 (Step S101). Accordingly, the ECUs (emergency brake ECU 310, security ECU 100, etc.) connected to bus 30 receive the measurement information indicating the distance between the obstacle and the vehicle and the relative speed between the obstacle and the vehicle.

When there is no risk of collision with an obstacle, emergency brake ECU 310 which periodically transmits brake control instructions transmits, to bus 30, data frames of the brake control instructions designating the zero deceleration (Step S102).

For example, immediately after emergency brake ECU 310 transmits one of the data frame of the brake control instruction, the unauthorized ECU transmits, to bus 30, a data frame of a brake control instruction (fraudulent brake control instruction) designating the maximum deceleration amount (Step S103). Note that if the unauthorized ECU transmits the data frame of the fraudulent brake control instruction in approximate synchronization with the transmission cycle of the data frame of the brake control instruction from emergency brake ECU 310, whether or not the brake control instruction is fraudulent cannot be determined on the basis of the transmission cycle.

In the control process (refer to FIG. 8), when the data frame of the brake control instruction transmitted by the unauthorized ECU is received up to the data field, security ECU 100 specifies distance L and relative speed V between the vehicle and the obstacle on the basis of the latest measurement information that has been received, selects predetermined condition C in accordance with a designation of an amount of deceleration, and determines whether or not the brake control instruction is fraudulent. In the example in FIG. 9, upon reception of the data frame of the brake control instruction transmitted from emergency brake ECU 310 in Step S102, security ECU 100 determines the brake control instruction as being appropriate because predetermined condition C is not satisfied. Furthermore, upon reception of the data frame of the brake control instruction transmitted from the unauthorized ECU in Step S103, security ECU 100 determines the brake control instruction as being fraudulent because predetermined condition C is satisfied.

When predetermined condition C is satisfied and the brake control instruction related to the received data frame that corresponds to Step S103 is determined as being fraudulent, security ECU 100 transmits an error frame (Step S104). As a result of this error frame transmission, the data frame of the fraudulent brake control instruction transmitted from the unauthorized ECU is invalidated (specifically, a portion of the data frame is overwritten on bus 30 with the error frame, resulting in invalidation), and thus is not used in the brake control of brake ECU 200. Therefore, in brake ECU 200, control processor 230 follows the brake control instruction received from emergency brake ECU 310, which corresponds to Step S102. Thus, control processor 230 in brake ECU 200 does not cause actuation of brake 201 that follows the fraudulent brake control instruction received from the unauthorized ECU (Step S105).

Note that if security ECU 100 is absent, the data frame of the fraudulent brake control instruction transmitted by the unauthorized ECU in Step S103 is not invalidated. In this case, the data frame of the fraudulent brake control instruction is completely received by brake ECU 200, and the brake control instruction transmitted from emergency brake ECU 310 and stored in data buffer 220, which corresponds to Step S102, is overwritten with the fraudulent brake control instruction. Control processor 230 of brake ECU 200 controls brake 201 in accordance with the fraudulent brake control instruction from the unauthorized ECU.

FIG. 10 illustrates an example where, in a situation just before vehicle 20 may soon collide with an obstacle, an unauthorized ECU transmits a data frame of a fraudulent brake control instruction (instruction for inhibiting brake actuation) to bus 30. With reference to FIG. 10, operations of the ECUs in control system 10 will be described below.

Sensor ECU 320 transmits, to bus 30, a data frame including measurement information indicating measurement results obtained by obstacle sensor 321 and speed sensor 322 (Step S201). This Step S201 is substantially the same as Step S101 in FIG. 9 described above.

Immediately before collision with an obstacle, emergency brake ECU 310 which periodically transmits brake control instructions transmits, to bus 30, data frames of the brake control instructions designating the maximum deceleration amount (Step S202).

For example, immediately after emergency brake ECU 310 transmits one of the data frames of the brake control instructions, the unauthorized ECU transmits, to bus 30, a data frame of a brake control instruction (fraudulent brake control instruction) designating the zero deceleration (Step S203).

In the control process (refer to FIG. 8), when the data frame of the brake control instruction transmitted by the unauthorized ECU is received up to the data field, security ECU 100 specifies distance L and relative speed V between the vehicle and the obstacle on the basis of the latest measurement information that has been received, selects predetermined condition C in accordance with a designation of the amount of deceleration, and determines whether or not the brake control instruction is fraudulent. In the example in FIG. 10, upon reception of the data frame of the brake control instruction transmitted from emergency brake ECU 310 in Step S102, security ECU 100 determines the brake control instruction as being appropriate because predetermined condition C is not satisfied. Furthermore, upon reception of the data frame of the brake control instruction transmitted from the unauthorized ECU in Step S203, security ECU 100 determines the brake control instruction as being fraudulent because predetermined condition C is satisfied.

When predetermined condition C is satisfied and the brake control instruction related to the received data frame that corresponds to Step S203 is determined as being fraudulent, security ECU 100 transmits an error frame (Step S204). As a result of this error frame transmission, the data frame of the fraudulent brake control instruction transmitted from the unauthorized ECU is invalidated, and thus is not used in the brake control of brake ECU 200. Therefore, in brake ECU 200, control processor 230 actuates brake 201 (Step S205) in accordance with the brake control instruction received from emergency brake ECU 310, which corresponds to Step S202.

[1.10 Advantageous Effects of the First Exemplary Embodiment]

In control system 10 according to the first exemplary embodiment, on the basis of measurement information obtained from sensor ECU 320 immediately before receiver 111 receives a brake control instruction (specifically, a data frame of a brake control instruction), controller 130 of security ECU (control apparatus) 100 specifies distance L between vehicle 20 and the obstacle and relative speed V of vehicle 20 with respect to the obstacle in response to the brake control instruction. Subsequently, when predetermined condition C involving distance L and relative speed V is satisfied, controller 130 performs an invalidation control of invalidating the brake control instruction by way of error frame transmission. Predetermined condition C may be different depending on whether the brake control instruction designates the maximum deceleration (maximum deceleration amount) or the zero deceleration. Predetermined condition C can be set so that a brake control instruction transmitted from emergency brake ECU 310 in a normal state does not satisfy predetermined condition C. When an unauthorized ECU transmits, to bus 30, a brake control instruction (specifically, a data frame of a fraudulent brake control instruction) different from that transmitted from emergency brake ECU 310, security ECU 100 determines the brake control instruction as being fraudulent and invalidates the brake control instruction by transmitting an error frame when predetermined condition C is satisfied, and thus it is suppressed that brake ECU 200 controls brake 201 in accordance with a fraudulent brake control instruction. In other words, in control system 10, security ECU 100 can properly handle a fraudulent frame (attack frame) related to a brake control instruction and suppress an accident from being caused by the attack frame.

Second Exemplary Embodiment

The following describes control system 11 obtained by transforming some of the ECUs of control system 10 according to the first exemplary embodiment installed in vehicle 20.

In control system 10 according to the first exemplary embodiment, when determining a brake control instruction (a data frame of a brake control instruction) flowing in bus 30 as being fraudulent, security ECU 100 invalidates the data frame of the brake control instruction by transmitting an error frame. In contrast, in control system 11 according to the present embodiment, security ECU 100 is not provided, and a brake ECU obtained by partially transforming brake ECU 200 described in the first exemplary embodiment determines whether or not the received brake control instruction is fraudulent, and when determining that the received brake control instruction is fraudulent, a brake control that follows the brake control instruction is not performed (that is, the brake control instruction is discarded), an example of which will be described.

[2.1 Configuration of Control System 11]

Figure 11:
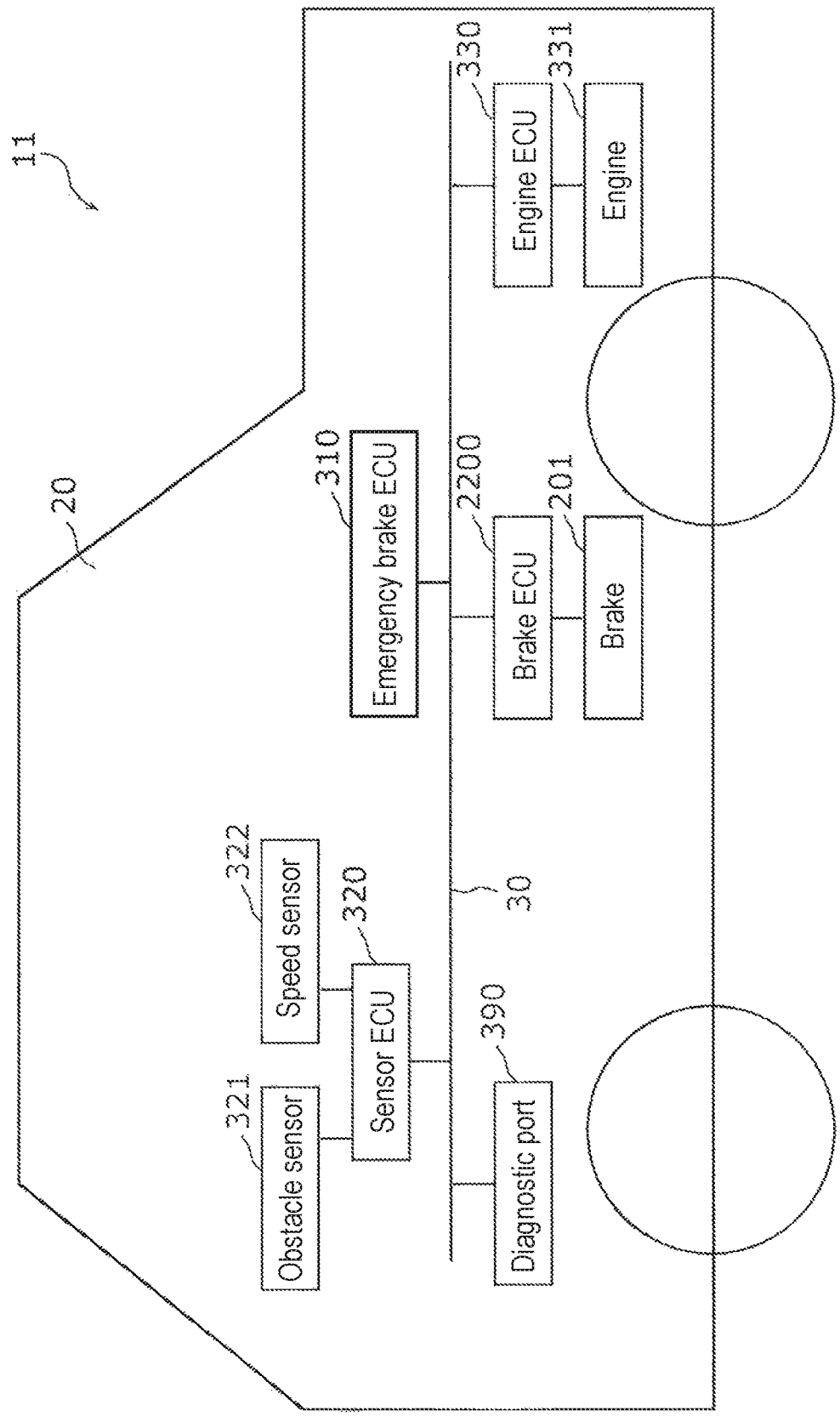
FIG. 11 is a diagram illustrating an overall configuration of a control system according to a second exemplary embodiment.

FIG. 11 is a diagram illustrating an overall configuration of control system 11 according to the present embodiment. In FIG. 11, structural elements that are substantially the same as those in control system 10 (refer to FIG. 1) described in the first exemplary embodiment are assigned the same reference numerals as in FIG. 1, and explanations thereof will be omitted.

Control system 11 is configured mainly as an in-vehicle network system on vehicle 20 and includes various ECUs installed in vehicle 20 (brake ECU 2200, emergency brake ECU 310, sensor ECU 320, and engine ECU 330) and bus (CAN bus) 30, as exemplified in FIG. 11. The features of control system 11 that are not particularly explained here are substantially the same as those of control system 10 described in the first exemplary embodiment.

[2.2 Configuration of Brake ECU 2200]

Figure 12:
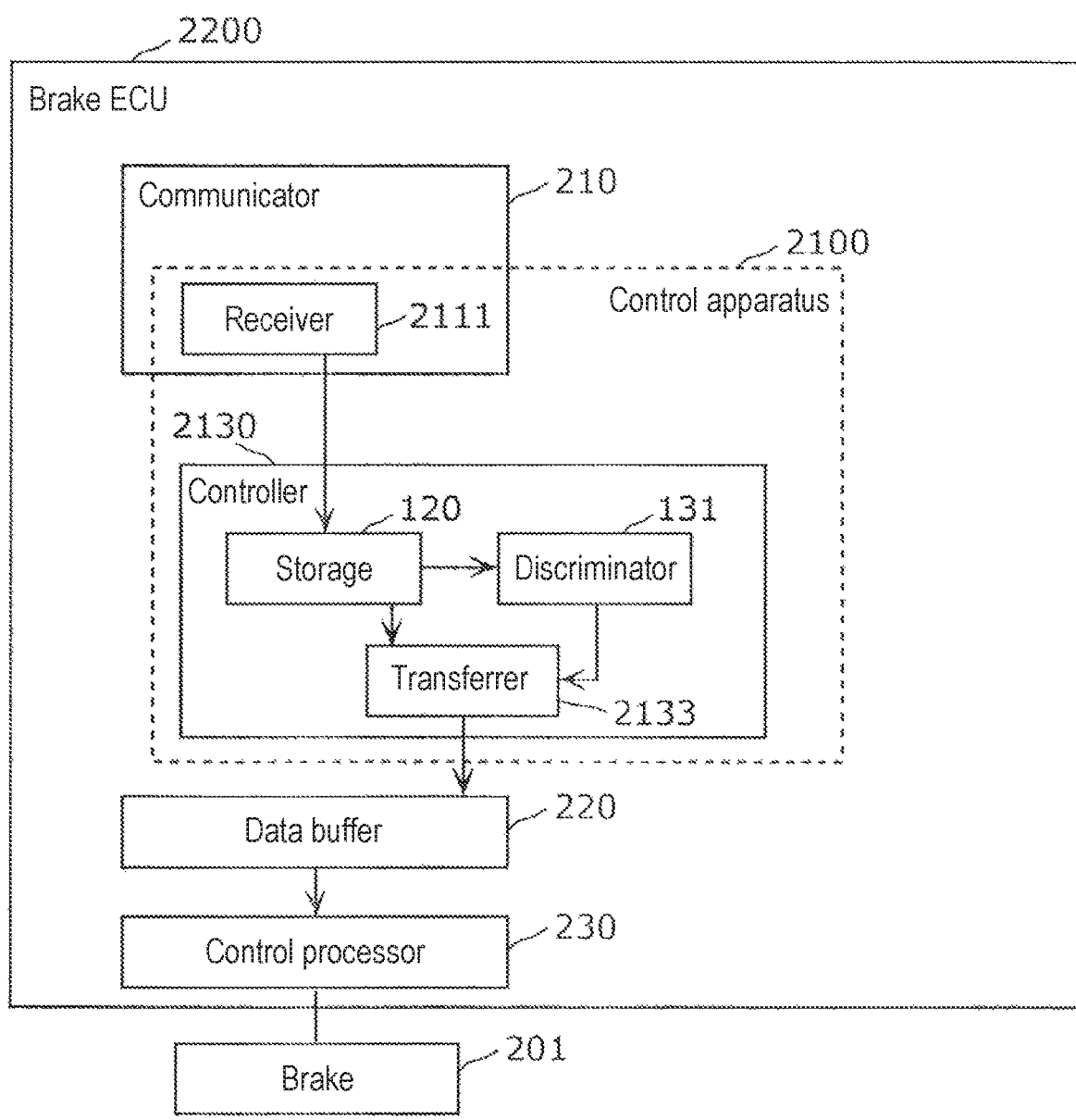
FIG. 12 is a configuration diagram of a brake ECU according to the second exemplary embodiment.

FIG. 12 is a configuration diagram of brake ECU 2200. Brake ECU 2200 is obtained by partially transforming brake ECU 200 described in the first exemplary embodiment. In FIG. 12, structural elements that are substantially the same as those in brake ECU 200 (refer to FIG. 4) are assigned the same reference numerals as in FIG. 4, and explanations thereof will be omitted as appropriate.

Brake ECU 2200, which is connected to brake 201 and used to control brake 201, includes communicator 210, data buffer 220, control processor 230, and controller 2130.

The functional configuration, of communicator 210, related to receiving a frame is represented as receiver 2111 in FIG. 12. Receiver 2111 receives a frame (sequentially receives the frame on 1-bit basis) from bus 30 according to the CAN protocol. Receiver 2111 includes the function of receiving a frame and the function of interpreting the received frame, and interprets the values in the frame received from bus 30 so as to map the values to the fields in the frame format specified in the CAN protocol. As a result of this interpretation, the ID (message ID), the DLC, and the data in the data field in the data frame are discerned and extracted. Receiver 2111 determines whether or not the extracted ID is one of the ID to be received such as the ID of a data frame indicating a brake control instruction, predetermined in the in-vehicle network system in control system 111, and the ID of a data frame indicating the measurement information transmitted from sensor ECU 320. If the extracted ID is not the ID to be received, receiver 2111 stops interpreting the frame.

When determining the frame as not complying with the CAN protocol, for example, in the case where the value of the CRC in the frame received by receiver 2111 is not correct or in the case where an item supposed to be fixedly dominant is recessive, communicator 210 performs control to transmit an error frame to bus 30. Furthermore, when receiving an error frame, specifically, when interpreting the received frame as an error frame from values therein, receiver 2111 discards the subsequent portion of the frame or, in other words, stops interpreting the subsequent portion of the frame. Receiver 2111 stores, into storage 120 in controller 2130, the content (ID, data in the data field, etc.) of the frame having an ID determined as the ID to be received.

Controller 2130 is provided with, for example, a processor which executes a control program, and includes the function of performing control to discard a brake control instruction through a filtering process in which transfer of information indicating a brake control instruction to data buffer 220 is inhibited under a predetermined condition. Controller 2130 includes storage 120, discriminator 131, and transferrer 2133. Storage 120 in controller 2130 is substantially the same as storage 120 in security ECU 100 described in the first exemplary embodiment, and is one storage region of a storage medium such as a memory for storing the content of a frame received by receiver 2111. For example, the contents of data frames related to measurement information sequentially transmitted from sensor ECU 320 and the contents (for example, the amount of deceleration) of data frames related to a brake control instruction are sequentially stored in storage 120. The measurement information indicates the distance between vehicle 20 and an obstacle and the relative speed of vehicle 20 with respect to the obstacle.

Discriminator 131 in controller 2130 is largely the same as discriminator 131 in security ECU 100 described in the first exemplary embodiment, and determines whether or not a brake control instruction is fraudulent in accordance with whether or not predetermined condition C involving distance L between vehicle 20 and an obstacle and speed (relative speed) V of vehicle 20 with respect to the obstacle upon reception of a data frame of the brake control instruction by receiver 2111 is satisfied. On the basis of the measurement information received by receiver 2111, discriminator 131 specifies distance L between vehicle 20 and the obstacle and speed (relative speed) V of vehicle 20 with respect to the obstacle, and on the basis of distance L and speed V that have been specified, discriminator 131 determines whether or not predetermined condition C is satisfied. Discriminator 131 reports, to transferrer 2133, the result of determining whether or not the brake control instruction is fraudulent. Discriminator 131 uses the distance between vehicle 20 and the obstacle and the speed of vehicle 20 (the speed relative to an obstacle) indicated in the latest measurement information upon reception of the data frame of the brake control instruction among the pieces of measurement information which have been sequentially stored in storage 120, as distance L between vehicle 20 and the obstacle and speed V of vehicle 20 upon reception of the data frame of the brake control instruction by receiver 2111. Note that as predetermined condition C for determining a brake control instruction as being fraudulent, one of a plurality of conditions can be selected, for example, in accordance with the deceleration amount designated in the brake control instruction, as described in the first exemplary embodiment.

When discriminator 131 determines the brake control instruction as not being fraudulent, transferrer 2133 transfers the content of the data frame related to the brake control instruction from storage 120 to data buffer 220, and when discriminator 131 determines the brake control instruction as being fraudulent, transferrer 2133 does not transfer the content of the data frame related to the brake control instruction from storage 120 to data buffer 220.

Data buffer 220 stores information which indicates an ID, data in the data field, etc. (that is, information indicating a brake control instruction) serving as the content of a data frame of a brake control instruction determined as not being fraudulent.

Control processor 230 obtains the content (information indicating a brake control instruction or the like) of the frame stored in data buffer 220, periodically or, for example, when a predetermined condition (such as a condition related to storing of a frame into data buffer 220) is met, and controls brake 201 by transmitting a control signal to brake 201 in accordance with the brake control instruction indicated in the obtained information.

Note that a portion (for example, receiver 211 and controller 2130) of brake ECU 2200 functions as control apparatus 2100 which properly handles an attack frame of a fraudulent brake control instruction.

[2.3 Control Process in Brake ECU 2200]

Figure 13:
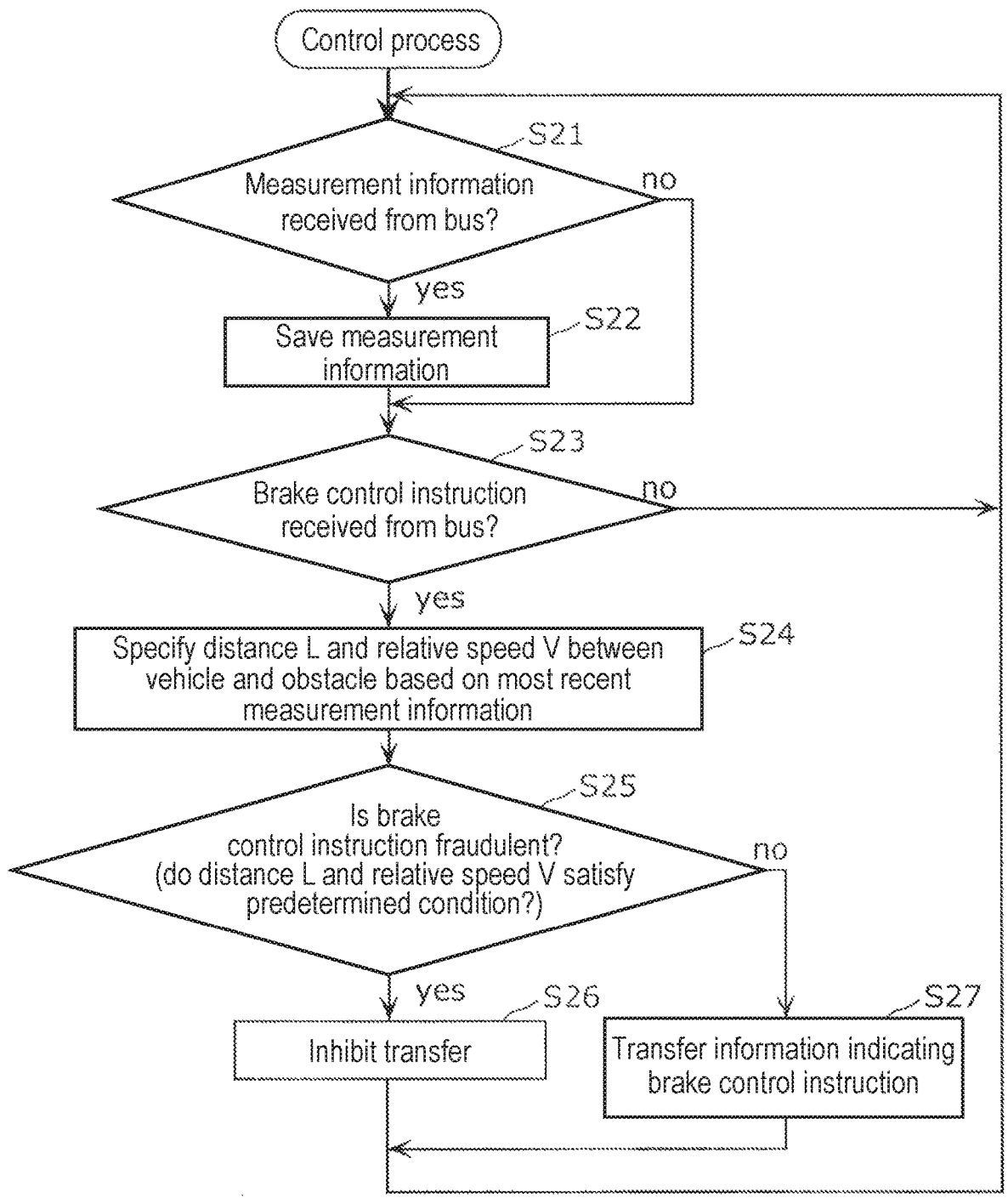
FIG. 13 is a flowchart illustrating a control process in the brake ECU illustrated in FIG. 12.

FIG. 13 illustrates one example of a control process in brake ECU 2200. With reference to FIG. 13, the following describes a control process which is performed to properly handle an attack frame of a fraudulent brake control instruction in brake ECU 2200.

When receiver 2111 receives, from bus 30, a data frame including measurement information transmitted by sensor ECU 320 (YES in Step S21), brake ECU 2200 saves, in other words, stores, the measurement information in storage 120 (Step S22). Thus, the measurement information indicating distance L (m) between an obstacle and the vehicle and relative speed V (km/h) between the obstacle and the vehicle is saved in storage 120. Sensor ECU 320 periodically transmits data frames each including measurement information indicating a measurement result obtained by a sensor, and thus saving measurement information in Step S22 is repeatedly performed.

When receiver 2111 receives the data frame of the brake control instruction from bus 30 (YES in Step S23), brake ECU 2200 specifies distance L and relative speed V between the vehicle and the obstacle using discriminator 131 on the basis of the latest measurement information saved most recently in storage 120 (Step S24). Subsequently, by determining whether or not predetermined condition C involving distance L and relative speed V that have been specified is satisfied, discriminator 131 determines whether or not the brake control instruction related to the data frame received in Step S23 is fraudulent (Step S25). When receiver 2111 receives the data frame of the brake control instruction, receiver 2111 stores, into storage 120, the deceleration amount, etc., designated in the brake control instruction, and thus discriminator 131 can specify, for example, whether the designated deceleration amount is maximum, zero, or any other values. Also in the present embodiment, discriminator 131 uses, for a brake control instruction including a designation of maximum deceleration, a condition where the result of predetermined calculation F(V, L) is greater than first threshold value a, as predetermined condition C, and uses, for a brake control instruction including a designation of zero deceleration, a condition where the result of predetermined calculation F(V, L) is less than second threshold value b which is less than or equal to first threshold value a, as predetermined condition C, as described in the first exemplary embodiment. Furthermore, discriminator 131 may use, for example, for a brake control instruction including a designation of a deceleration amount between zero and the maximum, a condition where the result of predetermined calculation F(V, L) is greater than first threshold value a or a condition where the result of predetermined calculation F(V, L) is greater or less than any other predetermined threshold value, as predetermined condition C.

When discriminator 131 determines in Step S25 that predetermined condition C is satisfied (YES in Step S25), this means that the brake control instruction is determined as being fraudulent. When the brake control instruction is determined as being fraudulent, transferrer 2133 does not transfer the content of the data frame of the brake control instruction from storage 120 to data buffer 220 (Step S26), and when the brake control instruction is determined as not being fraudulent, transferrer 2133 transfers the content of the data frame of the brake control instruction from storage 120 to data buffer 220 (Step S27). By these processes from Steps S25 to S27, brake ECU 2200 inhibits control of brake 201 that follows a fraudulent brake control instruction and thus controls brake 201 in accordance with an appropriate brake control instruction.

[2.4 Process Sequence Related to Brake Control in Control System 11]

Figure 14:
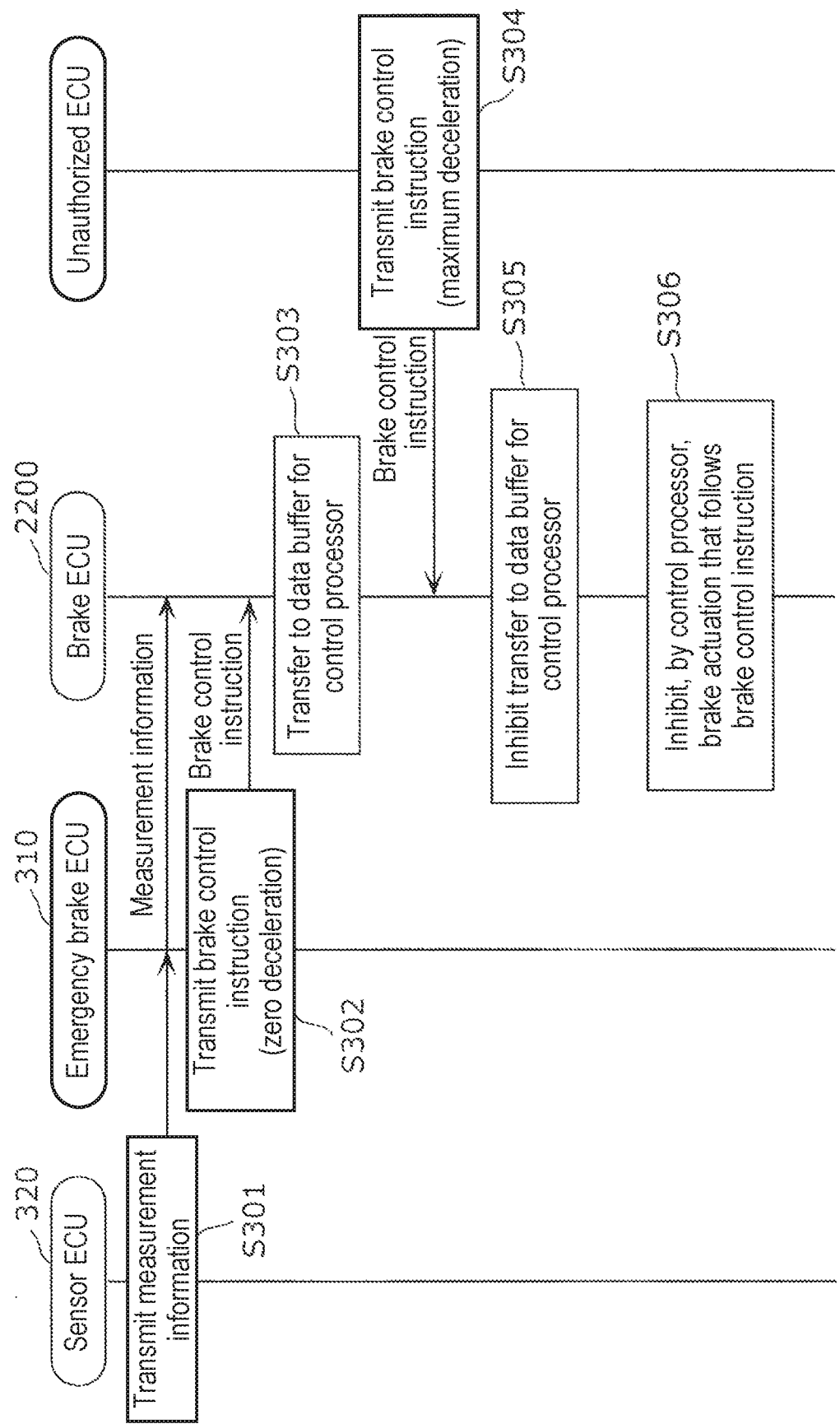
FIG. 14 is a diagram illustrating one example of a process sequence related to a brake control according to the second exemplary embodiment.
Figure 15:
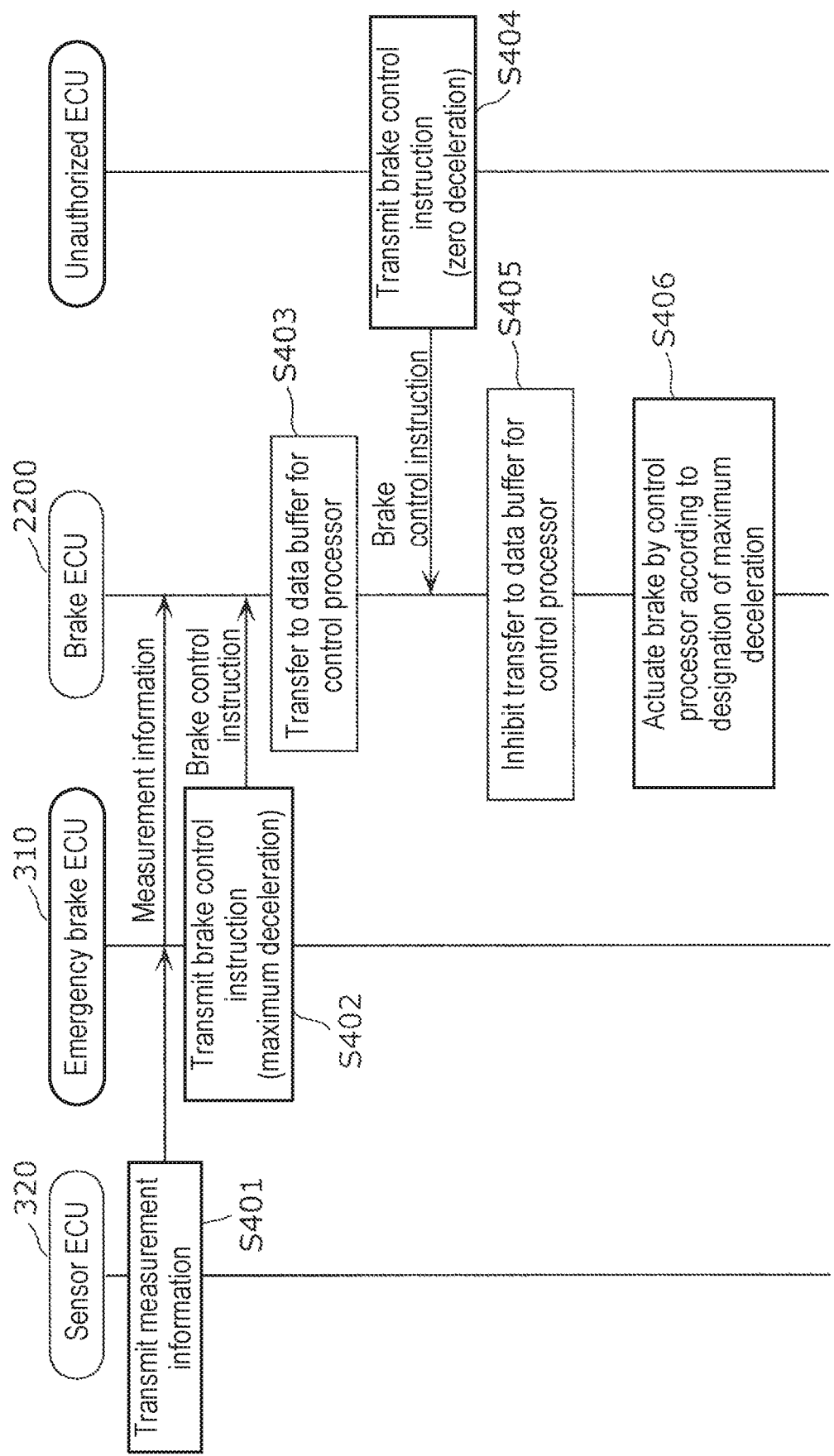
FIG. 15 is a diagram illustrating one example of a process sequence related to the brake control according to the second exemplary embodiment.

FIG. 14 and FIG. 15 illustrate one example of a process sequence related to a brake control in control system 11.

FIG. 14 illustrates an example where, in a situation in which there is no risk that vehicle 20 will collide with an obstacle, an apparatus (referred to as an unauthorized ECU) connected to diagnostic port 390 transmits a data frame of a fraudulent brake control instruction (instruction for causing an abrupt braking action) to bus 30. With reference to FIG. 14, operations of ECUs in control system 11 will be described below.

Sensor ECU 320 transmits, to bus 30, a data frame including measurement information indicating measurement results obtained by obstacle sensor 321 and speed sensor 322 (Step S301). Accordingly, the ECUs (emergency brake ECU 310, brake ECU 2200, etc.) connected to bus 30 receive the measurement information indicating the distance between the obstacle and the vehicle and the relative speed of the vehicle with respect to the obstacle.

When there is no risk of collision with an obstacle, emergency brake ECU 310 which periodically transmits brake control instructions transmits, to bus 30, data frames of brake control instructions designating the zero deceleration (Step S302).

When receiving the data frame of the brake control instruction transmitted by emergency brake ECU 310, brake ECU 2200 specifies distance L and relative speed V between the vehicle and the obstacle on the basis of the latest measurement information that has been received, selects predetermined condition C in accordance with a designation of a deceleration amount, and determines whether or not the brake control instruction is fraudulent, according to the control process (refer to FIG. 13). In the example in FIG. 14, the brake control instruction is determined as being appropriate because predetermined condition C is not satisfied, and transferrer 2133 transfers, from storage 120 to data buffer 220, the content of the data frame of the brake control instruction received from bus 30 (Step S303).

Subsequently, for example, immediately after emergency brake ECU 310 transmits a data frame of a brake control instruction, the unauthorized ECU transmits, to bus 30, a data frame of a brake control instruction (fraudulent brake control instruction) designating the maximum deceleration (Step S304).

When receiving the data frame of the brake control instruction transmitted by the unauthorized ECU, brake ECU 2200 specifies distance L and relative speed V between the vehicle and the obstacle on the basis of the latest measurement information that has been received, selects predetermined condition C in accordance with a designation of a deceleration amount, and determines whether or not the brake control instruction is fraudulent, according to the control process. In the example in FIG. 14, the brake control instruction is determined as being fraudulent because predetermined condition C is satisfied. In this case, transferrer 2133 does not transfer, from storage 120 to data buffer 220, the content of the data frame of the brake control instruction received from bus 30 (Step S305).

Subsequently, control processor 230 of brake ECU 2200 performs a brake control that follows the brake control instruction indicated in the information stored in data buffer 220 in Step S303, and thus does not actuate brake 201 in accordance with the fraudulent brake control instruction (Step S306).

FIG. 15 illustrates an example where, in a situation just before vehicle 20 may soon collide with an obstacle, the unauthorized ECU transmits a data frame of a fraudulent brake control instruction (instruction for inhibiting brake actuation) to bus 30. With reference to FIG. 15, operations of the ECUs in control system 11 will be described below.

Sensor ECU 320 transmits, to bus 30, a data frame including measurement information indicating measurement results obtained by obstacle sensor 321 and speed sensor 322 (Step S401). This Step S401 is substantially the same as Step S301 in FIG. 14 described above.

Immediately before collision with an obstacle, emergency brake ECU 310 which periodically transmits brake control instructions transmits, to bus 30, data frames of the brake control instructions designating the maximum deceleration amount (Step S402).

When receiving the data frame of the brake control instruction transmitted by emergency brake ECU 310, brake ECU 2200 specifies distance L and relative speed V between the vehicle and the obstacle on the basis of the latest measurement information that has been received, selects predetermined condition C in accordance with a designation of a deceleration amount, and determines whether or not the brake control instruction is fraudulent, according the control process. In the example in FIG. 15, the brake control instruction is determined as being appropriate because predetermined condition C is not satisfied, and transferrer 2133 transfers, from storage 120 to data buffer 220, the content of the data frame of the brake control instruction received from bus 30 (Step S403).

Subsequently, for example, immediately after emergency brake ECU 310 transmits a data frame of a brake control instruction, the unauthorized ECU transmits, to bus 30, a data frame of a brake control instruction (fraudulent brake control instruction) designating the zero deceleration (Step S404).

When receiving the data frame of the brake control instruction transmitted by the unauthorized ECU, brake ECU 2200 specifies distance L and relative speed V between the vehicle and the obstacle on the basis of the latest measurement information that has been received, selects predetermined condition C in accordance with a designation of a deceleration amount, and determines whether or not the brake control instruction is fraudulent, according the control process. In the example in FIG. 15, the brake control instruction is determined as being fraudulent because predetermined condition C is satisfied. In this case, transferrer 2133 does not transfer, from storage 120 to data buffer 220, the content of the data frame of the brake control instruction received from bus 30 (Step S405).

Subsequently, control processor 230 of brake ECU 2200 performs control to actuate brake 201 in accordance with the brake control instruction indicated in the information stored in data buffer 220 in Step S403, and thus does not inhibit actuation of brake 201 in accordance with the fraudulent brake control instruction (Step S406).

[2.5 Advantageous Effects of the Second Exemplary Embodiment]

In control system 11 according to the second exemplary embodiment, controller 2130 of control apparatus 2100 functions as a portion of brake ECU 2200. On the basis of measurement information obtained from sensor ECU 320 immediately before receiver 2111 receives a brake control instruction (specifically, a data frame of a brake control instruction), controller 2130 specifies distance L between vehicle 20 and the obstacle and relative speed V of vehicle 20 with respect to the obstacle in response to the brake control instruction. Subsequently, when predetermined condition C involving distance L and relative speed V is satisfied, controller 2130 performs filtering so that the brake control instruction is not transferred to data buffer 220. Through this filtering, controller 2130 performs control to discard the brake control instruction. Predetermined condition C may be different depending on whether the brake control instruction designates the maximum deceleration or the zero deceleration. Predetermined condition C can be set so that a brake control instruction transmitted from emergency brake ECU 310 in a normal state does not satisfy predetermined condition C. When an unauthorized ECU transmits, to bus 30, a brake control instruction (specifically, a data frame of a fraudulent brake control instruction) different from that transmitted from emergency brake ECU 310, controller 2130 determines the brake control instruction as being fraudulent when predetermined condition C is satisfied. Subsequently, controller 2130 performs filtering so that information indicating the brake control instruction is not transferred to data buffer 220. Thus, control processor 230 can be suppressed from controlling brake 201 in accordance with the fraudulent brake control instruction. In other words, in control system 11, brake ECU 2200 can properly handle a fraudulent frame (attack frame) related to a brake control instruction and suppress an accident from being caused by the attack frame.

Other Modified Examples

The first and second exemplary embodiments have been described above as examples of techniques according to the present disclosure. The techniques according to the present disclosure, however, are not limited to the foregoing exemplary embodiments, and can also be applied to exemplary embodiments obtained by carrying out modification, substitution, addition, omission, etc. For example, the following modified examples are also exemplary embodiments of the present disclosure.

(1) The first exemplary embodiment described above shows an example in which security ECU 100 obtains, via bus 30, the distance between vehicle 20 and an obstacle and the speed of vehicle 20 (the relative speed with respect to the obstacle) (the example of obtaining the distance and the speed by way of receiving a data frame including measurement information). Aside from this, for example, using each sensor connected to security ECU 100 by a dedicated communication line, upon reception of a data frame of a brake control instruction (specifically, within a predetermined period before and after the reception), the distance between vehicle 20 and an obstacle and the speed of vehicle 20 (the relative speed with respect to the obstacle) may be measured and thus directly obtained. Furthermore, instead of the relative speed of vehicle 20 with respect to the obstacle described in the above exemplary embodiments, the absolute speed of vehicle 20 may be obtained by speed sensor 322, and a condition involving the distance between vehicle 20 and the obstacle and the absolute speed of vehicle 20 may be used as a predetermined condition for determining whether or not the brake control instruction is fraudulent.

(2) The second exemplary embodiment described above shows an example in which a portion of brake ECU 2200 functions as control apparatus 2100 which properly addresses an attack frame of a fraudulent brake control instruction. Specifically, when a predetermined condition for determining a brake control instruction as being fraudulent is not satisfied, controller 2130 stores, into data buffer 220, information indicating the brake control instruction received by receiver 2111, and when the predetermined condition is satisfied, controller 2130 performs control to avoid storing, into data buffer 220, information indicating the brake control instruction received by receiver 2111 and thus discard the brake control instruction. Aside from this, brake ECU 2200 may function as a control apparatus which properly addresses an attack frame of a fraudulent brake control instruction. For example, controller 2130 may include the functions of control processor 230, and when a predetermined condition for determining a brake control instruction as being fraudulent is not satisfied, controller 2130 may control brake 201 in accordance with the brake control instruction received by receiver 2111, and when the predetermined condition is satisfied, controller 2130 may perform control to inhibit control of brake 201 that follows the brake control instruction received by receiver 211 and thus discard the brake control instruction.

(3) The predetermined condition for determining a brake control instruction as being fraudulent, described in the above exemplary embodiments, may be set in accordance with each type of vehicle 20. Specifically, the predetermined condition may be set to be the same for all of a plurality of vehicles 20 of the same type and may be set to be different for each of a plurality of vehicles 20 of different types. Vehicles of the same type herein are, for example, vehicles of the same model (car model). As an example, the vehicles of the same type are vehicles having vehicle chassis numbers with the same model value or vehicles having vehicle identification numbers (VINs) with the same values from the starting digit to the digit before the serial number.

(4) Controllers 130, 2130 described in the above exemplary embodiments may modify the content of predetermined calculation F(V, L) related to predetermined condition C for determining a brake control instruction as being fraudulent, in accordance with a change in a structural element of vehicle 20 that has an effect on a braking distance by brake 201 of vehicle 20. For example, controllers 130, 2130 may modify the coefficient, etc., of polynomial function G in predetermined calculation F(V, L)=L−G(V) according to replacement, degradation, or the like of a tire, a component of brake 201, etc., of vehicle 20. Note that controllers 130, 2130 may obtain, for example, information of the tire, the component of brake 201, etc., by way of communication or any other method or may calculate the degree of degradation of the tire, the component of brake 201, etc., using information from a clock, an odometer measuring the distance traveled, or the like. Furthermore, the coefficient, etc., of polynomial function G described above may be modified, for example, in accordance with the road surface condition (paved or gravel), the weather (sunny, rainy, or snowy), or the like.

(5) Obstacle sensor 321 described in the above exemplary embodiments may detect, for example, the type of an obstacle (for example, the type for discerning a person from an object other than a person), and sensor ECU 320 described in the above exemplary embodiments may transmit, to bus 30, a data frame including obstacle information indicating the type of the obstacle. Subsequently, receivers 111, 2111 may receive the data frame including the obstacle information from bus 30, and controllers 130, 2130 may change the content of predetermined calculation F(V, L) related to predetermined condition C for determining a brake control instruction as being fraudulent in accordance with the type indicated in the obstacle information received by receivers 111, 2111.

(6) Although the above exemplary embodiments show an example in which the data frame of the brake control instruction includes a designation of a deceleration amount, the data frame does not necessarily need to include the designation of the deceleration amount. For example, the data frame of the brake control instruction may include designation indicating that the brake is to be actuated or designation indicating that actuation of the brake is to be inhibited. In this case, upon determining whether or not the brake control instruction is fraudulent, the designation indicating that the brake is to be actuated may be treated substantially the same as, for example, a designation of maximum deceleration, and the designation indicating that actuation of the brake is to be inhibited may be treated substantially the same as, for example, a designation of zero deceleration.

(7) In the above exemplary embodiments, the standard ID format (refer to FIG. 2) is described as the format of a data frame in the CAN protocol, but the format may be an extended ID format, and the ID (message ID) of a data frame may be an extended ID, etc., in the extended ID format. Furthermore, the CAN protocol described in the above exemplary embodiments may be the CAN protocol in a broad meaning that encompasses derivative protocols such as the time-triggered CAN (TTCAN) and the CAN with flexible data rate (CANFD).

(8) The function allocation of various structural elements included in control systems 10, 11 described in the above exemplary embodiments is merely examples; this allocation may be changed. Furthermore, a portion of the functions of controller 130 or the like in security ECU 100 may be allocated to an apparatus (for example, a server apparatus, etc., outside vehicle 20) capable of communicating with security ECU 100.

(9) Each of the ECUs in the above exemplary embodiments is, for example, an apparatus including a communication circuit, an analog circuit, and a digital circuit such as a memory and a processor, but may include hardware structural elements such as a hard disk device, a display, a keyboard, and a mouse. Furthermore, each apparatus described in the above exemplary embodiments may provide its function using dedicated hardware (such as a digital circuit) instead of providing its function in software approach as a result of the processor executing the control program stored in the memory.

(10) A portion or all of the structural elements of each apparatus in the above exemplary embodiments may be configured from one system large scale integration (LSI). A system LSI is a super-multifunction LSI manufactured with a plurality of components integrated on a single chip, and is specifically a computer system configured of a microprocessor, a ROM, and a RAM, for example. A computer program is recorded on the RAM. The system LSI achieves its function as a result of the microprocessor operating according to the computer program. Moreover, each of the units of the structural elements included in each of the above-described apparatuses may be individually configured into a single chip, or a portion or all of the units may be configured into a single chip. Although a system LSI is mentioned here, the integrated circuit can also be called an IC, an LSI, a super LSI, and an ultra LSI, depending on differences in the degree of integration. Furthermore, the method of circuit integration is not limited to LSIs, and implementation through a dedicated circuit or a general-purpose processor is also possible. A field programmable gate array (FPGA) which allows programming after LSI manufacturing or a reconfigurable processor which allows reconfiguration of the connections and settings of the circuit cells inside the LSI may also be used. In addition, depending on the emergence of circuit integration technology that replaces LSI due to progress in semiconductor technology or other derivative technology, it is obvious that such technology may be used to integrate the function blocks. Possibilities in this regard include the application of biotechnology and the like.

(11) Furthermore, some or all of the structural elements included in each of the above-described apparatuses may be implemented as an IC card or a standalone module that can be inserted into and removed from the corresponding apparatus. Each of the IC card and the module is a computer system configured with a microprocessor, a ROM, a RAM, and so forth. Each of the IC card and the module may include the aforementioned super multifunctional LSI. The microprocessor operates according to the computer program in order that a function of the IC card or the module is carried out. The IC card or the module may be tamper resistant.

(12) One aspect of the present disclosure may be a control method including all or part of the processing flows illustrated in, for example, FIG. 8 to FIG. 10 and FIG. 13 to FIG. 15. For example, the control method includes: a reception step (for example, Steps S13, S23) of receiving a brake control instruction from bus 30 used for communication among a plurality of ECUs in vehicle 20; and a control step (for example, Steps S15, S16, S25, S26) of performing control to invalidate or discard the brake control instruction when a predetermined condition involving the distance between vehicle 20 and an obstacle and the speed of vehicle 20 upon reception of the brake control instruction in the reception step is satisfied. Furthermore, one aspect of the present disclosure may be a computer program for implementing a process related to this control method using a computer or may be a digital signal of the computer program.

The process related to this control method is, for example, a fraud detection process including the reception step (for example, Steps S13, S23) and a determining step (for example, Steps S15, S25). In the reception step, the brake control instruction is received from bus 30 used for communication among the plurality of ECUs in vehicle 20. In the determining step, whether or not the brake control instruction is fraudulent is determined (detected) in accordance with whether or not a predetermined condition involving the distance between vehicle 20 and the obstacle and the speed of vehicle 20 upon reception of the brake control instruction in the reception step is satisfied.

Furthermore, one aspect of the present disclosure may be provided as the computer program or the digital signal recorded on computer-readable storage media, such as a flexible disk, a hard disk, a CD-ROM, an MO, a DVD, a DVD-ROM, a DVD-RAM, a Blu-ray Disc (BD) (registered trademark), or a semiconductor memory. The present disclosure may also be the digital signal recorded on these storage media. Moreover, one aspect of the present disclosure may be the computer program or the digital signal transmitted, for example, via a telecommunication line, a wireless or wired communication line, a network represented by the Internet, or data broadcasting. Furthermore, one aspect of the present disclosure may be a computer system including a microprocessor and a memory. The memory may store the aforementioned computer program and the microprocessor may operate according to the computer program. Moreover, by transferring the storage medium having the aforementioned program or digital signal recorded thereon or by transferring the aforementioned program or digital signal via the aforementioned network or the like, the present disclosure may be implemented by a different independent computer system.

(13) Forms obtained by arbitrarily combining the structural elements and functions described in the above exemplary embodiments and modified examples are also included in the scope of the present disclosure.

The present disclosure is applicable to address an attack in which a frame of a fraudulent brake control instruction is transmitted to a network on a movable-body apparatus such as a vehicle that requires a brake.

What is claimed is:

1. A control apparatus comprising:
    a receiver which, in operation, receives an instruction for controlling a brake of a movable-body apparatus;
    a discriminator which, in operation,
        (i) determines, in response to the instruction being received by the receiver, an indicator based on a speed of the movable-body apparatus and a distance between the movable-body apparatus and an obstacle, and
        (ii) determines, in a case where the instruction is inconsistent with a situation of the movable-body apparatus determined in accordance with the indicator and a predetermined threshold value, that the instruction is a fraudulent instruction that should not be followed; and
    a controller which, in operation, performs control so as not to execute control based on the instruction in response to the instruction being determined as a fraudulent instruction.

2. The control apparatus according to claim 1,
    wherein the controller performs control so as not to execute control based on the instruction by invalidating or discarding the instruction.

3. The control apparatus according to claim 1,
    wherein the speed is a relative speed of the movable-body apparatus with respect to the obstacle.

4. The control apparatus according to claim 1,
    wherein the discriminator determines the indicator by a predetermined calculation based on the speed and the distance.

5. The control apparatus according to claim 4,
    wherein the instruction includes an amount of deceleration by the brake,
    in a case where the instruction includes a maximum amount of deceleration, and a result of the predetermined calculation is greater than a first threshold value, the discriminator determines that the instruction is a fraudulent instruction, and
    in a case where the instruction includes zero deceleration, and the result of the predetermined calculation is less than a second threshold value less than or equal to the first threshold value, the discriminator determines that the instruction is a fraudulent instruction.

6. The control apparatus according to claim 5,
    wherein the predetermined calculation is set to have a result less than or equal to the first threshold value and greater than or equal to the second threshold value in a case where the instruction transmitted from an emergency brake electronic control unit in a normal state includes an amount of deceleration greater than zero.

7. The control apparatus according to claim 4,
    wherein the controller, in operation, modifies a detail of the predetermined calculation in accordance with a change in a structural element of the movable-body apparatus that affects a braking distance of the movable-body apparatus of the brake.

8. The control apparatus according to claim 4,
    wherein the receiver, in operation, receives obstacle information that indicates a type of the obstacle and is detected by the movable-body apparatus, and
    the controller, in operation, modifies a detail of the predetermined calculation in accordance with the obstacle information.

9. The control apparatus according to claim 1,
    wherein, in a case where the instruction instructs the brake to be actuated, the discriminator determines a ratio of the distance to the speed, as the indicator.

10. The control apparatus according to claim 1,
    wherein a predetermined condition is set in accordance with a type of the movable-body apparatus, the predetermined condition being a condition for determining that the instruction is a fraudulent instruction that should not be followed in the case where the instruction is inconsistent with the situation of the movable-body apparatus.

11. The control apparatus according to claim 1,
    wherein the receiver, in operation, receives measurement information that indicates measurement results of the speed and the distance and is measured by the movable-body apparatus, and
    the discriminator determines, based on the speed and the distance indicated by the measurement information, whether or not the instruction is a fraudulent instruction.

12. The control apparatus according to claim 1,
    wherein the receiver, in operation, performs communication via a network according to a Controller Area Network protocol, and receives the instruction in a data frame, and
    the controller, in operation, performs control to transmit an error frame for invalidating the data frame in response to the instruction being determined as a fraudulent instruction.

13. The control apparatus according to claim 1,
    wherein the receiver, in operation, receives a data frame including the instruction using a sensor which is communicatively coupled to a dedicated communication line.

14. The control apparatus according to claim 1,
    wherein the control apparatus is an electronic control unit among at least one or more electronic control units, the electronic control unit, in operation, controlling the brake of the movable-body apparatus,
    in response to the instruction being determined as a fraudulent instruction, the controller performs control to inhibit control of the brake that follows the instruction by discarding the instruction.

15. The control apparatus according to claim 1,
wherein at least one or more electronic control units in the movable-body apparatus include a brake electronic control unit,
the brake electronic control unit includes storage medium and a brake controller which, in operation, controls the brake in accordance with information stored in the storage medium,
the control apparatus is included in the brake electronic control unit,
in response to the instruction being determined as a fraudulent instruction, the controller performs control to discard the instruction by avoiding storing, into the storage medium, information indicating the instruction.

16. The control apparatus according to claim 1,
wherein the instruction is inconsistent in a case where the instruction includes designating a maximum deceleration amount for actuating the brake when designating the maximum deceleration amount for actuating the brake is not needed.

17. The control apparatus according to claim 1,
wherein the instruction is inconsistent in a case where the instruction includes designating zero deceleration amount for actuating the brake when designating more than a predetermined deceleration amount for actuating the brake is needed.

18. The control apparatus according to claim 1,
wherein the discriminator determines that the instruction is a fraudulent instruction that should not be followed in a case where a relation between the indicator and the predetermined threshold value indicates a situation where actuating the brake is not needed, and the instruction includes designating a maximum deceleration amount for actuating the brake.

19. The control apparatus according to claim 1,
wherein the discriminator determines that the instruction is a fraudulent instruction that should not be followed in a case where a relation between the indicator and the predetermined threshold value indicates a situation where actuating the brake is needed, and the instruction includes designating zero deceleration amount for actuating the brake.

20. A control system comprising:
a brake provided to a movable-body apparatus;
a detection apparatus which, in operation, detects an obstacle; and
a control apparatus, including:
 a receiver which, in operation, receives an instruction for controlling the brake;
 a discriminator which, in operation,
  (i) determines, in response to the instruction being received by the receiver, an indicator based on a speed of the movable-body apparatus and a distance between the movable-body apparatus and the obstacle, and
  (ii) determines, in a case where the instruction is inconsistent with a situation of the movable-body apparatus determined in accordance with the indicator and a predetermined threshold value, that the instruction is a fraudulent instruction that should not be followed; and
 a controller which, in operation, performs control so as not to execute control based on the instruction in response to the instruction being determined as a fraudulent instruction.

21. A control method comprising:
receiving an instruction for controlling a brake of a movable-body apparatus;
determining, in response to the receiving of the instruction, an indicator based on a speed of the movable-body apparatus and a distance between the movable-body apparatus and an obstacle;
determining, in a case where the instruction is inconsistent with a situation of the movable-body apparatus determined in accordance with the indicator and a predetermined threshold value, that the instruction is a fraudulent instruction that should not be followed; and
performing control so as not to execute control based on the instruction in response to the instruction being determined as a fraudulent instruction.

22. A non-transitory storage medium storing thereon a control program for causing an apparatus including a microprocessor to perform a fraud detection process,
wherein the fraud detection process includes:
receiving an instruction for controlling a brake of a movable-body apparatus;
determining, in response to the receiving of the instruction, an indicator based on a speed of the movable-body apparatus and a distance between the movable-body apparatus and an obstacle;
determining, in a case where the instruction is inconsistent with a situation of the movable-body apparatus determined in accordance with the indicator and a predetermined threshold value, that the instruction is a fraudulent instruction that should not be followed; and
performing control so as not to execute control based on the instruction in response to the instruction being determined as a fraudulent instruction.

\* \* \* \* \*